United States Patent
Han et al.

(10) Patent No.: US 12,488,567 B2
(45) Date of Patent: Dec. 2, 2025

(54) IMAGE AUTHENTICITY DETECTION METHOD AND APPARATUS

(71) Applicant: Tencent Technology (Shenzhen) Company Limited, Guangdong (CN)

(72) Inventors: Zhou Han, Guangdong (CN); Zhuang Zhang, Guangdong (CN); Zhiqiang Dong, Guangdong (CN)

(73) Assignee: Tencent Technology (Shenzhen) Company Limited (CN)

(*) Notice: Subject to any disclaimer, the term of this patent is extended or adjusted under 35 U.S.C. 154(b) by 419 days.

(21) Appl. No.: 17/979,883

(22) Filed: Nov. 3, 2022

(65) Prior Publication Data
US 2023/0056564 A1 Feb. 23, 2023

Related U.S. Application Data

(63) Continuation of application No. PCT/CN2022/085430, filed on Apr. 7, 2022.

(30) Foreign Application Priority Data

May 11, 2021 (CN) .................. 202110512723.X

(51) Int. Cl.
*G06F 21/30* (2013.01)
*G06T 5/70* (2024.01)
(Continued)

(52) U.S. Cl.
CPC ........... *G06V 10/771* (2022.01); *G06F 21/30* (2013.01); *G06T 5/70* (2024.01); *G06V 10/761* (2022.01)

(58) Field of Classification Search
CPC .... G06V 10/771; G06V 10/761; G06V 10/82; G06V 10/30; G06V 10/431; G06V 40/40;
(Continued)

(56) References Cited

U.S. PATENT DOCUMENTS

| | | | |
|---|---|---|---|
| 2017/0295014 A1* | 10/2017 | Baras | H04L 9/3231 |
| 2020/0364513 A1 | 11/2020 | Asendorf et al. | |
| 2023/0030792 A1* | 2/2023 | Zheng | G06V 10/7715 |

FOREIGN PATENT DOCUMENTS

| | | |
|---|---|---|
| CN | 1925546 A | 3/2007 |
| CN | 110121109 A | 8/2019 |

(Continued)

OTHER PUBLICATIONS

Akshatha et al, Source Camera Identification Using Noise Residual, 2016, IEEE International Conference on Recent Trends in Electronics Information Communication Technology, pp. 1080-1084. (Year: 2016).*

(Continued)

*Primary Examiner* — Kathleen M Broughton
(74) *Attorney, Agent, or Firm* — Crowell & Moring LLP

(57) ABSTRACT

This disclosure is directed to an image authenticity detection method and apparatus. The method includes: obtaining an image; removing low-frequency information from the image to obtain first image information of the image; denoising the first image information to obtain second image information; determining, based on a difference between the first image information and the second image information, a fixed pattern noise feature map corresponding to the image; analyzing distribution of fixed pattern noise in the fixed pattern noise feature map, the fixed pattern noise being inherent noise from a camera sensor and not interfered by image content; and detecting, based on the distribution, authenticity of the image to obtain an authenticity detection result of the image.

19 Claims, 10 Drawing Sheets

(51) Int. Cl.
*G06V 10/74* (2022.01)
*G06V 10/771* (2022.01)

(58) Field of Classification Search
CPC . G06F 21/30; G06F 21/64; G06T 5/70; G06T 7/0002; G06Q 30/0185
See application file for complete search history.

(56) References Cited

FOREIGN PATENT DOCUMENTS

| | | | | |
|---|---|---|---|---|
| CN | 111709408 A | | 9/2020 | |
| CN | 111709930 A | * | 9/2020 | ........... G06T 7/0002 |
| CN | 112991345 A | | 6/2021 | |
| CN | 112991345 B | | 8/2021 | |

OTHER PUBLICATIONS

Cai et al, CNN-based Camera Model Identification Using Image Noise in Frequency Domain, 2019, IEEE International Conference on Systems, Man and Cybernetics, pp. 3518-3524. (Year: 2019).*

Zhou et al, Single-Frame Remote Sensing Image Super-Resolution Reconstruction Algorithm Based on Two-Dimensional Wavelet, 2018, 3rd IEEE International Conference on Image, Vision and Computing, pp. 360-363. (Year: 2018).*

Pande et al, Hardware Architecture for Video Authentication Using Sensor Pattern Noise, 2014, IEEE Transactions on Circuits and Systems for Video Technology, (24)1: pp. 157-167. (Year: 2013).*

International Search Report issued Jun. 22, 2022 in International (PCT) Application No. PCT/CN2022/085430.

Cai et al. "CNN-based Camera Model Identification Using Image Noise in Frequency Domain," IEEE International Conference on Systems, Man and Cybernetics (SMC), Oct. 2019, 3518-3524.

Chen et al., "Determining Image Origin and Integrity Using Sensor Noise," IEEE Transactions on Information Forensics and Security, Feb. 2008, 3(1):74-90.

Extended European Search Report in European application No. 22806367.3, dated Jun. 20, 2024, 8 pages.

Gupta et al., "A Study on Source Device Attribution Using Still Images," Archives of Computational Methods in Engineering, Jun. 2020, 28(4):2209-2223.

* cited by examiner

IMAGE AUTHENTICITY DETECTION METHOD AND APPARATUS

RELATED APPLICATION

This application is a continuation application of PCT Patent Application No. PCT/CN2022/085430, filed on Apr. 7, 2022, which claims priority to Chinese Patent Application No. 202110512723.X, entitled "IMAGE AUTHENTICITY DETECTION METHOD AND APPARATUS, COMPUTER DEVICE, AND STORAGE MEDIUM", filed with the Chinese Patent Office on May 11, 2021, wherein the content of the of the above-referenced applications is incorporated herein by reference in its entirety.

FIELD OF THE TECHNOLOGY

This disclosure relates to the field of computer technologies and image processing technologies, and in particular, to an image authenticity detection method and apparatus, a computer device, and a storage medium.

BACKGROUND OF THE DISCLOSURE

With the rapid development of science and technology, especially image processing technologies, which brings much convenience for human life, at the same time, forged images generated by image tampering or image synthesis gradually appear for profit-making or creating forged news and other illegalities. For example: Some may utilize synthesized faces maliciously in videos to fake another person during identity verification when registering with software. Therefore, it is very important to detect the authenticity of images in order to ensure the safety of people's lives, properties, and reputation.

In conventional methods, the authenticity of images is detected by extracting features related to image content. However, the features related to image content are easily affected by image background changes, image illumination changes, image content occlusion, or facial expressions and motions, due to which it is difficult to ensure relatively high robustness of the detection method, resulting in inaccuracy of the detection results.

SUMMARY

Based on this, to resolve the foregoing technical problems, it is necessary to provide an image authenticity detection method and apparatus, a computer device, and a storage medium.

In an aspect of the disclosure, an image authenticity detection method is performed by a computer device and includes:
  obtaining an image;
  removing low-frequency information from the image to obtain first image information of the image;
  denoising the first image information to obtain second image information;
  determining, based on a difference between the first image information and the second image information, a fixed pattern noise feature map corresponding to the image;
  analyzing distribution of fixed pattern noise in the fixed pattern noise feature map, the fixed pattern noise being inherent noise from a camera sensor and not interfered by image content; and
  detecting, based on the distribution, authenticity of the image to obtain an authenticity detection result of the image.

In another aspect of the disclosure, an image authenticity detection apparatus includes: a memory operable to store computer-readable instructions and a processor circuitry operable to read the computer-readable instructions. When executing the computer-readable instructions, the processor circuitry is configured to:
  obtain an image;
  remove low-frequency information from the image to obtain first image information of the image;
  denoise the first image information to obtain second image information;
  determine, based on a difference between the first image information and the second image information, a fixed pattern noise feature map corresponding to the image;
  analyze distribution of fixed pattern noise in the fixed pattern noise feature map, the fixed pattern noise being inherent noise from a camera sensor and not interfered by image content; and
  detect, based on the distribution, authenticity of the image to obtain an authenticity detection result of the image.

In another aspect of the disclosure, a non-transitory machine-readable media store instructions. When being executed, the instructions are configured to cause a machine to:
  obtain an image;
  remove low-frequency information from the image to obtain first image information of the image;
  denoise the first image information to obtain second image information;
  determine, based on a difference between the first image information and the second image information, a fixed pattern noise feature map corresponding to the image;
  analyze distribution of fixed pattern noise in the fixed pattern noise feature map, the fixed pattern noise being inherent noise from a camera sensor and not interfered by image content; and
  detect, based on the distribution, authenticity of the image to obtain an authenticity detection result of the image.

Details of one or more embodiments of this disclosure are provided in the accompanying drawings and descriptions below. Other features, objectives, and advantages of this disclosure become obvious with reference to the specification, the accompanying drawings, and the claims.

BRIEF DESCRIPTION OF THE DRAWINGS

To describe the technical solutions in the embodiments of this disclosure more clearly, the following briefly describes the accompanying drawings required for describing the embodiments. Apparently, the accompanying drawings in the following description show merely some embodiments of this disclosure, and a person of ordinary skill in the art may derive other drawings from these accompanying drawings without creative efforts.

DESCRIPTION OF EMBODIMENTS

To make the objectives, technical solutions, and advantages of this disclosure clearer and more understandable, this disclosure is further described in detail below with reference to accompanying drawings and embodiments. It is to be understood that the specific embodiments described herein are only used for explaining this disclosure, and are not used for limiting this disclosure.

Figure 1:
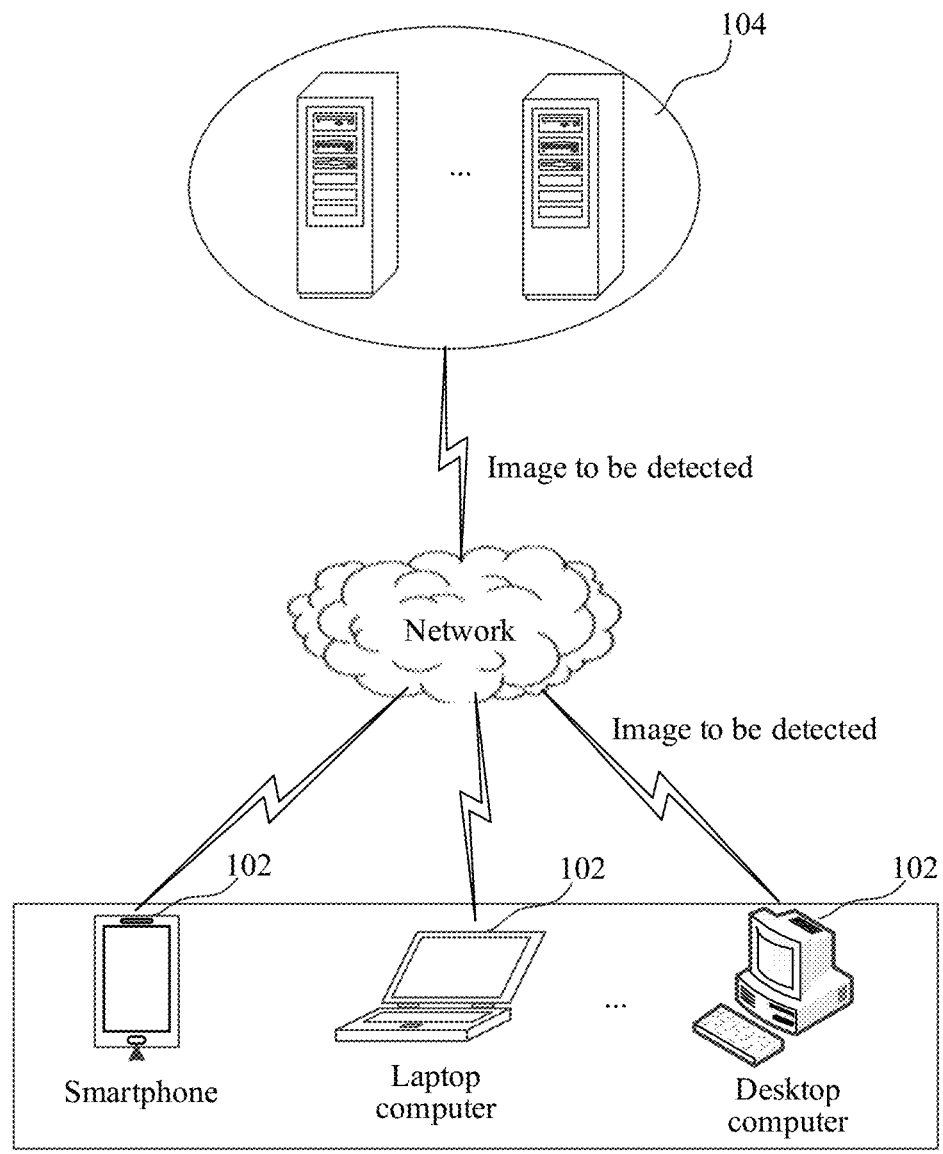
FIG. 1 is a diagram of an application environment of an image authenticity detection method in an embodiment.

An image authenticity detection method provided in this disclosure may be applied to an application environment shown in FIG. 1. A terminal 102 communicates with a server 104 through a network. The terminal 102 may be, but not limited to, a personal computer, a notebook computer, a smartphone, a tablet computer, and a portable wearable device. The server 104 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

In an embodiment, a user may use a terminal 102 to input an image, and the terminal 102 may send the image to a server 104. The server 104 may perform the image authenticity detection method in various embodiments of this disclosure, to obtain an authenticity detection result of the image. The server 104 may determine, based on the authenticity detection result, whether to further process the image, and return a processing result to the terminal 102. For example: The image is a face image, and if the authenticity detection result indicates that the image is an authentic image, the server 104 may perform face recognition on the image, and return a recognition result to the terminal 102; or if the authenticity detection result indicates that the image is a forged image, the server 104 may not perform face recognition, and return a result that the image is a forged image to the terminal 102.

In an embodiment, the image authenticity detection method in the embodiments of this disclosure may be implemented using the method of machine learning in the field of artificial intelligence. For example: A step of analyzing distribution of fixed pattern noise in a fixed pattern noise feature map, and detecting, based on the distribution, the authenticity of the image, to obtain an authenticity detection result of the image may be implemented using the method of machine learning.

In an embodiment, the image authenticity detection method in the embodiments of this disclosure further relates to computer vision technologies. For example: The steps of removing low-frequency information from the image to obtain first image information, denoising the first image information to obtain denoised second image information, and obtaining, based on a difference between the first image information and the second image information, a fixed pattern noise feature map corresponding to the image all relate to computer vision technologies.

In an embodiment, the image authenticity detection method in the embodiments of this disclosure may further relate to block chain technologies. For example: A server or terminal that performs the image authenticity detection method in the embodiments of this disclosure may be a node in a block chain system.

Figure 2:
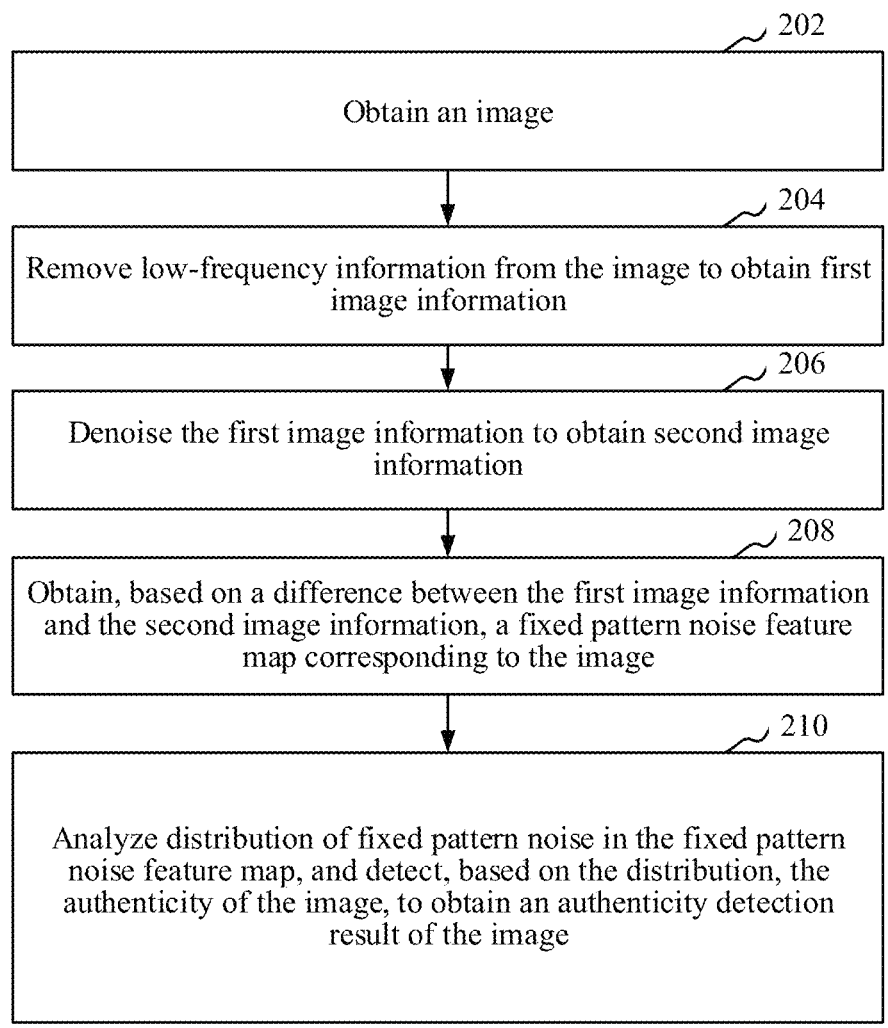
FIG. 2 is a schematic flowchart of an image authenticity detection method in an embodiment.

In an embodiment, as shown in FIG. 2, an image authenticity detection method is provided. The image authenticity detection method may be performed by a computer device, where the computer device may include a server and a terminal, and it is to be understood that the image authenticity detection method may be performed by either the server or the terminal independently, or may be performed by the terminal and the server together. This embodiment of this disclosure describes that the method is applied to a server in FIG. 1 and includes the following steps:

Step 202: Obtain an image.

The image is an image whose authenticity is required to be detected.

In an embodiment, the image may be a face image, that is, an image including a face. In other embodiments, the image may alternatively be an image including other things, for example: an image showing a person, an object or landscapes, and any image whose authenticity is required to be detected can be used as the image. This is not limited.

In an embodiment, the image may be an image extracted from a video that is to be detected. In an embodiment, the server may sample the video that is to be detected to obtain a plurality of video frames, and the server may use the plurality of video frames as a plurality of images that are to be detected, and perform the method in the embodiments of this disclosure on each image to obtain an authenticity detection result of each image. In another embodiment, the server may extract a frame of image from the video that is to be detected as the image, and perform the method in the embodiments of this disclosure on the image to obtain an authenticity detection result of the image.

In an embodiment, the server may first crop, based on a preset size, the image, and then perform step 204 and subsequent steps based on the image that is cropped and to be detected.

In an embodiment, the server may center crop, based on a preset size, the image. The center cropping is a process of cropping an image while using the center of the image as the center of an image obtained after the cropping.

Specifically, the server may crop the image while using the center of the image as the center of the image obtained after the cropping, to obtain the image obtained after the cropping that is of the preset size. For example: It is assumed that the preset size is [224, 224], and then the server can utilize the center of the image and crop at a position with a distance of 112 from the center in each of four directions of up, down, left, and right, and the image obtained after the cropping that has a center that is the center of the image and that is of the size [224, 224] is an image that is obtained after the cropping and to be detected. It is to be understood that if the image is a multichannel image, the preset size will have one more dimension indicating the quantity of channels. For example, if the image is a three-channel image, the preset size can be [224, 224, 3].

Step 204: Remove low-frequency information from the image to obtain first image information.

The low-frequency information is an image signal in a low frequency band of the image. The first image information is image information that is obtained after removing the low-frequency information from the image and that does not include the low-frequency information.

In an embodiment, the server may decompose and remove the low-frequency information in the image by performing domain transform on the image, to obtain the first image information. In an embodiment, the domain transform may be any one of the wavelet transform, the Fourier transform, and the like.

In another embodiment, the server may filter the image by using a high-pass filter, to remove the low-frequency information from the image to obtain the first image information.

In other embodiments, the server may alternatively remove the low-frequency information from the image in other manners, to obtain the first image information. This is not limited.

Step 206: Denoise the first image information to obtain denoised second image information.

The denoising is a process of reducing noise in an image. The denoised second image information is image information obtained by denoising the first image information.

In an embodiment, the server may perform noise filtering on an image corresponding to the first image information in the spatial domain to obtain the denoised second image information. In another embodiment, the server may perform noise filtering on the first image information in the transform domain to obtain second image information in the transform domain. In an embodiment, the transform domain may be any one of the wavelet domain, the frequency domain, and the like.

In an embodiment, the server may perform noise filtering on the first image information by using a Wiener filter. In other embodiments, the server may alternatively use other filters to perform noise filtering on the first image information, for example: a mean filter or a median filter.

Step 208: Obtain, based on a difference between the first image information and the second image information, a fixed pattern noise feature map corresponding to the image.

The fixed pattern noise feature map is an image containing fixed pattern noise in the image. Fixed pattern noise is the noise generated in the image due to inherent defects in the production of camera sensors. The main component in fixed pattern noise is the feature of photo-response non-uniformity (PRNU).

It is to be understood that because there is a defect in the production of camera sensors that the silicon coatings between pixels are different, there is a tiny difference in the photosensitivity of the photosensitive elements of imaging devices, and this tiny difference causes a fixed error distribution in a whole photosensitive array, while this distribution further implicitly exists in images captured by a camera in the form of a multiplicative factor. An image model may be viewed as a composite of a noise-free image and noise. A mathematical model is shown in the following equation:

$$y_{ij}=f_{ij}(x_{ij}+\eta_{ij})+c_{ij}+\varepsilon_{ij}$$

where $y_{ij}$ is an image outputted by a camera sensor, $x_{ij}$ is incident light received by the camera sensor, $f_{ij}$ is a photo-response non-uniformity multiplicative noise factor, $\eta_{ij}$ is shot noise, $c_{ij}$ is dark current noise, and $\varepsilon_{ij}$ is additional random noise. $i=1, \ldots, m$, $j=1, \ldots n$, and m×n is the resolution of the camera sensor. The feature of photo-response non-uniformity (namely, the feature of PRNU) implicitly exist in an image captured by a camera in the form of photo-response non-uniformity multiplicative noise factor in the foregoing equation.

Figure 3:
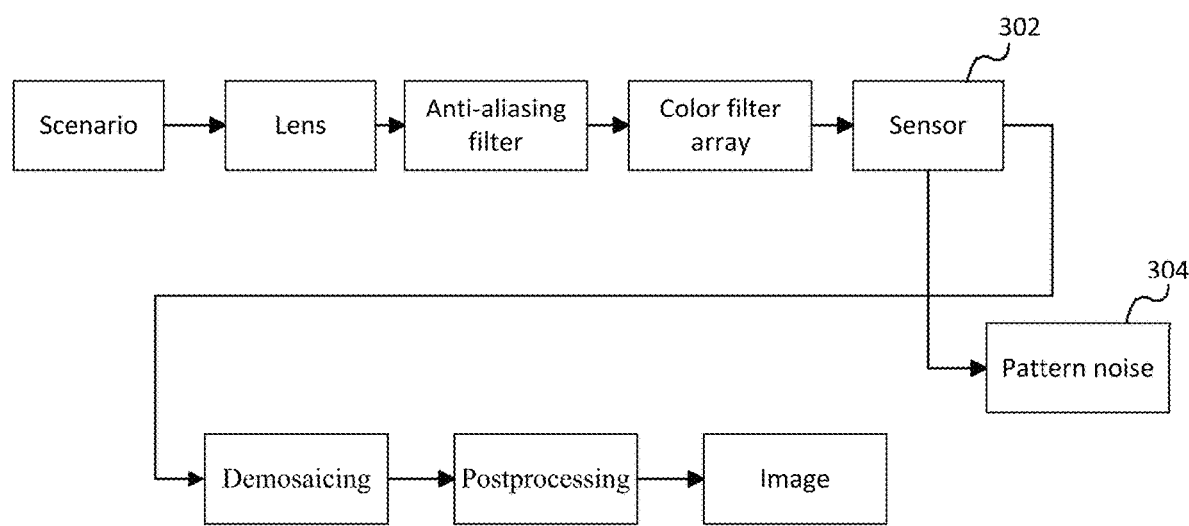
FIG. 3 is a schematic diagram of the principle of introducing a pattern noise during camera shooting in an embodiment.

As shown in FIG. 3, during image capturing of the camera, when an incident light in a real scenario being captured passes through a camera sensor 302, pattern noise 304 (that is, fixed pattern noise) is caused, resulting in a finally generated image containing the pattern noise. A signal of the feature of photo-response non-uniformity that is the main component of pattern noise is weak, mostly in the high-frequency details, and not affected by temperature or humidity, which is an inherent attribute of sensors and is distinguishable between different devices.

In an embodiment, the server may subtract the second image information from the first image information, and obtain, based on a result of subtracting the second image information from the first image information, a fixed pattern noise feature map corresponding to the image.

It is to be understood that the fixed pattern noise feature map obtained based on the difference between the first image information and the second image information is a residual that includes not only fixed pattern noise but also some other noise, for example, dark current noise. In the image authenticity detection method in the embodiments of this disclosure, the feature of photo-response non-uniformity does not need to be particularly extracted from the image, but only the fixed pattern noise residual needs to be extracted, thereby improving computation efficiency.

In an embodiment, if the image is a multichannel image, the server may obtain a fixed pattern noise feature map from a single channel in various channels, and then combine the fixed pattern noise feature maps of all single channels in the various channels, to obtain the multichannel fixed pattern noise feature map corresponding to the image.

In an embodiment, the server may perform image enhancement on the fixed pattern noise feature map prior to performing step 210. In an embodiment, the image enhancement may include at least one of zero-mean filtering, peak suppression in Fourier transform, and the like. It is to be understood that zero-mean filtering can remove linear patterns in the fixed pattern noise feature map and prevent brighter lines in the fixed pattern noise feature map. Peak suppression in Fourier transform can suppress a region of the fixed pattern noise feature map with a higher peak in the frequency domain, to deblock the fixed pattern noise feature map and prevent sharp edges.

Step 210: Analyze distribution of fixed pattern noise in the fixed pattern noise feature map, and detect, based on the distribution, the authenticity of the image, to obtain an authenticity detection result of the image; and the fixed pattern noise is inherent noise from a camera sensor and not interfered by image content.

In an embodiment, the server may use the method of machine learning for analyzing the distribution of the fixed pattern noise in the fixed pattern noise feature map, and detecting, based on the distribution, the authenticity of the image, to obtain an authenticity detection result of the image.

In other embodiments, the server may alternatively use other methods for analyzing the distribution of the fixed pattern noise in the fixed pattern noise feature map. For example, the server may compare the fixed pattern noise feature map with fixed pattern noise feature map templates that each correspond to different preset authenticity detection results, and determine an authenticity detection result corresponding to a matched fixed pattern noise feature map template to be the authenticity detection result of the image.

In an embodiment, the authenticity detection result may include at least that the image is an authentic image, that the image is a forged image, and so on.

In another embodiment, the authenticity detection result may include at least that the image being detected is an authentic image, that the image is a forged image of a forgery type, and so on.

In an embodiment, the forgery type may include at least one of a type of tampering, a type of synthesis, a type of artificial intelligence generation, and the like. That is, the forged image of the forgery type may include at least one of an image forged by a type of tampering, an image forged by a type of synthesis, an image forged by a type of artificial intelligence generation, and the like.

The image forged by a type of tampering means that the image is a forged image obtained by tampering with an authentic image. An image forged by a type of synthesis means that the image is a forged image synthesized by using a computer. An image forged by a type of artificial intelligence generation means that the image is a forged image generated by using a machine learning model of artificial intelligence. For example: a forged image generated by generative adversarial nets (GANs).

In an embodiment, if the image is an image extracted from a video that is to be detected, and only one frame of image is extracted from the video that is to be detected as the image, the server may directly use the authenticity detection result of the image as an authenticity detection result of the video to be detected.

In another embodiment, if the image is an image extracted from a video that is to be detected, and a plurality of frames of images are extracted from the video that is to be detected as a plurality of images that are to be detected, the server may determine, based on authenticity detection results of the various images that are to be detected, an authenticity detection result of the video to be detected. In an embodiment, the server may determine, based on a proportion of an authenticity detection result of each of the images that are to be detected, the authenticity detection result of the video to be detected. For example: The server may select an authenticity detection result with a largest proportion from the authenticity detection results of the various images that are to be detected as the authenticity detection result of the video that is to be detected.

According to the image authenticity detection method described above, the low-frequency information is removed from the image to obtain the first image information, the first image information is denoised to obtain the denoised second image information, and the fixed pattern noise feature map corresponding to the image is obtained based on the difference between the first image information and the second image information, where the fixed pattern noise in the fixed pattern noise feature map is inherent noise from a camera sensor and not interfered by image content, so that distribution of pattern noise in an authentic image is different from that in a forged image, and the difference, without being interfered by image content, is not difficult to be identified. Therefore, by analyzing the distribution of the fixed pattern noise in the fixed pattern noise feature map, an accurate authenticity detection result of the image can be obtained, and the accuracy of the authenticity detection result is improved.

In an embodiment, that the low-frequency information is removed from the image to obtain the first image information includes: Domain transform is performed on the image in the spatial domain to obtain low-frequency information and high-frequency information in the transform domain; and the low-frequency information is removed, and the first image information in the transform domain is obtained based on the retained high-frequency information.

In an embodiment, the first image information includes high-frequency information of the image in the frequency domain. The server may perform Fourier transform on the image in the spatial domain, and transform the image from the spatial domain to the frequency domain, to obtain low-frequency information and the high-frequency information of the image in the frequency domain, and then the server may remove the low-frequency information and obtain the high-frequency information in the frequency domain.

In another embodiment, the first image information includes a wavelet coefficient of a high-frequency component of the image in the wavelet domain. The server may perform wavelet transform on the image in the spatial domain, and transform the image from the spatial domain to the wavelet domain, to obtain a low-frequency component and a high-frequency component of the image in the wavelet domain, and then the server may set a wavelet coefficient of the low-frequency component to zero to obtain the wavelet coefficient of the high-frequency component in the wavelet domain.

In other embodiments, the server may perform other domain transform on the image in the spatial domain, as long as the transform can separate out a low-frequency component. This is not limited.

In the foregoing embodiment, the server can perform domain transform on the image in the spatial domain to obtain the low-frequency information and the high-frequency information in the transform domain, remove the low-frequency information, and then obtain the first image information in the transform domain based on the retained high-frequency information, so that the low-frequency information is particularly removed from the image and the first image information including the high-frequency information is obtained. As the fixed pattern noise is mainly in the high-frequency information, determining particularly the first image information including the high-frequency information helps to determine particularly the fixed pattern noise feature map subsequently.

In an embodiment, the first image information includes wavelet coefficients of high-frequency components of the image in various directions in the wavelet domain. In this embodiment, that the low-frequency information is removed from the image to obtain the first image information includes: Wavelet transform is performed on the image in the spatial domain, and the image is decomposed into a low-frequency component, and high-frequency components in a plurality of directions, in the wavelet domain; and a wavelet coefficient of the low-frequency component is set to zero to obtain the wavelet coefficients of the high-frequency components in the various directions.

Specifically, the server may perform wavelet transform on the image in the spatial domain, and decompose the image into the low-frequency component, and the high-frequency components in the plurality of directions, in the wavelet domain, and then the server may set the wavelet coefficient of the low-frequency component to zero and obtain the wavelet coefficients that are not set to zero of the high-frequency components in the various directions.

In an embodiment, the high-frequency components in the plurality of directions may include at least one of a horizontal high-frequency component, a vertical high-frequency component, a diagonal high-frequency component, and the like.

In an embodiment, the server may perform multi-scale wavelet transform on the image in the spatial domain, and decompose the image into a low-frequency component and high-frequency components at various scales, where high-frequency components at the same scale include high-frequency components in a plurality of directions. The server may set the wavelet coefficient of the low-frequency component to zero to obtain the wavelet coefficients that are not set to zero of the high-frequency components in the various directions at the various scales.

In an embodiment, the order of the multi-scale wavelet transform may be set to any number based on the particular situation. For example: it may be a 4th-order wavelet transform.

In an embodiment, the wavelet basis for the wavelet transform may be Daubechies 4 (db4), or other wavelet functions may be selected as the wavelet basis. This is not limited.

In the foregoing embodiment, the server obtains the wavelet coefficients of the high-frequency components in the various directions by particularly decomposing the image into the low-frequency component and the high-frequency components in the plurality of directions through wavelet transform and then setting the wavelet coefficient of the low-frequency component to zero, so that the wavelet coefficients of the high-frequency components can be particularly obtained. As the fixed pattern noise is mainly in the high-frequency information, determining particularly the wavelet coefficients of the high-frequency components helps to determine particularly the fixed pattern noise feature map subsequently.

In an embodiment, the second image information includes denoised high-frequency wavelet coefficients corresponding to the high-frequency components of the image in the various directions in the wavelet domain. In this embodiment, that the first image information is denoised to obtain the denoised second image information includes: The wavelet coefficients of the high-frequency components in the various directions are denoised to obtain the denoised high-frequency wavelet coefficients corresponding to the high-frequency components in the various directions. In this embodiment, that the fixed pattern noise feature map corresponding to the image is obtained based on the difference between the first image information and the second image information includes: High-frequency noise wavelet coefficients corresponding to the high-frequency components in the various directions are obtained based on a difference between the wavelet coefficients of the high-frequency components and the denoised high-frequency wavelet coefficients of the high-frequency components that correspond to the same direction; and inverse wavelet transform is performed based on the wavelet coefficient of the low-frequency component that is set to zero and the high-frequency noise wavelet coefficients corresponding to the high-frequency components in the various directions, to obtain the fixed pattern noise feature map corresponding to the image.

The denoised high-frequency wavelet coefficients are wavelet coefficients of non-noise information in the high-frequency components that are obtained by denoising the wavelet coefficients of the high-frequency components. The high-frequency noise wavelet coefficients are wavelet coefficients of noise information in the high-frequency components.

In an embodiment, the server may use a Wiener filter to perform noise filtering on the wavelet coefficients of the high-frequency components in the various directions to obtain the denoised high-frequency wavelet coefficients corresponding to the high-frequency components in the various directions. In other embodiments, the server may alternatively use other filters to perform noise filtering on the wavelet coefficients of the high-frequency component in the various directions, for example: a mean filter or a median filter.

In an embodiment, the server may subtract a denoised high-frequency wavelet coefficient from a wavelet coefficient of a high-frequency component that correspond to the same direction to obtain the high-frequency noise wavelet coefficients corresponding to the high-frequency components in the various directions.

In an embodiment, when multi-scale wavelet transform is performed on the image in the spatial domain, the image is decomposed into the low-frequency component and the high-frequency components at various scales, and high-frequency components at the same scale include high-frequency components in a plurality of directions, the server may denoise wavelet coefficients of the high-frequency components in the various directions at the various scales to obtain denoised high-frequency wavelet coefficients corresponding to the high-frequency components in the various directions at the various scales. Then, the server may obtain high-frequency noise wavelet coefficients corresponding to the high-frequency components in the various directions at the various scales based on a difference between a wavelet coefficient of a high-frequency component and a denoised high-frequency wavelet coefficient that correspond to the same direction at the same scale. Then, the server may perform inverse wavelet transform based on the wavelet coefficient of the low-frequency component that is set to zero and the high-frequency noise wavelet coefficients corresponding to the high-frequency components in the various directions at the various scales, to obtain the fixed pattern noise feature map corresponding to the image.

In the foregoing embodiment, the server can obtain the high-frequency noise wavelet coefficients corresponding to the high-frequency components in the various directions based on a difference between the wavelet coefficient of the high-frequency component and the denoised high-frequency wavelet coefficient, obtained after the denoising, that correspond to the same direction, and then perform inverse wavelet transform based on the wavelet coefficient of the low-frequency component that is set to zero and the high-frequency noise wavelet coefficients corresponding to the high-frequency components in the various directions, to obtain the fixed pattern noise feature map corresponding to the image, so that the fixed pattern noise feature map including fixed pattern noise can be particularly obtained, thereby improving the accuracy of detecting the authenticity of images. In addition, the fixed pattern noise feature map including fixed pattern noise can be obtained simply based on the difference between the wavelet coefficient of the high-frequency component and the denoised high-frequency wavelet coefficient, and the image authenticity detection can be performed simply by extracting a residual, without having to extracting particularly the feature of photo-response non-uniformity, thereby improving the efficiency and convenience of the image authenticity detection.

In an embodiment, that wavelet transform is performed on the image in the spatial domain, and the image is decomposed into the low-frequency component, and the high-frequency components in the plurality of directions, in the wavelet domain includes: Multi-scale wavelet transform is performed on the image in the spatial domain, and the image is decomposed into a low-frequency component, and high-frequency components at various scales; and high-frequency components at the same scale include high-frequency components in a plurality of directions. In this embodiment, that inverse wavelet transform is performed based on the wavelet coefficient of the low-frequency component that is set to zero and the high-frequency noise wavelet coefficients corresponding to the high-frequency components in the various directions, to obtain the fixed pattern noise feature map corresponding to the image includes: Inverse wavelet transform is performed based on the wavelet coefficient of the low-frequency component that is set to zero and the high-frequency noise wavelet coefficients corresponding to the high-frequency components in the various directions at the various scales, to obtain the fixed pattern noise feature map corresponding to the image.

Specifically, the server may perform multi-scale wavelet transform on the image in the spatial domain, and decompose the image into a low-frequency component and high-frequency components at various scales, where high-frequency components at the same scale include high-frequency components in a plurality of directions. Then, the server may set a wavelet coefficient of the low-frequency component to zero to obtain the wavelet coefficients that are not set to zero of the high-frequency components in the various directions at the various scales. Then, the server may denoise the wavelet coefficients of the high-frequency components in the various directions at the various scales to obtain the denoised high-frequency wavelet coefficients corresponding to the high-frequency components in the various directions at the various scales. The server may obtain the high-frequency noise wavelet coefficients corresponding to the high-frequency components in the various directions at the various scales based on the difference between the wavelet coefficient of the high-frequency component and the denoised high-frequency wavelet coefficient that correspond to the same direction at the same scale. Finally, the server may perform inverse wavelet transform based on the wavelet coefficient of the low-frequency component that is set to zero and the high-frequency noise wavelet coefficients corresponding to the high-frequency components in the various directions at the various scales, to obtain the fixed pattern noise feature map corresponding to the image.

In an embodiment, the server may first denoise, at the same scale, high-frequency components in each direction at the scale successively, and obtain a high-frequency noise wavelet coefficient corresponding to the high-frequency component in the direction at the scale based on a difference between a wavelet coefficient of a high-frequency component and a denoised high-frequency wavelet coefficient that correspond to the same direction, thereby obtaining high-frequency noise wavelet coefficients corresponding to high-frequency components in various directions at the scale. Then, at a next scale, the server may denoise the high-frequency components in various directions at the scale successively. The process continues in this way until all high-frequency components in various directions at various scales are processed.

In the foregoing embodiment, the server can perform multi-scale wavelet transform on the image in the spatial domain, to determine the high-frequency information in the image with higher accuracy, and perform noise filtering based on the accurate high-frequency information, to improve the accuracy of the denoising, thereby helping determine the fixed pattern noise feature map accurately.

In an embodiment, that the wavelet coefficients of the high-frequency components in the various directions are denoised to obtain the denoised high-frequency wavelet coefficients corresponding to the high-frequency components in the various directions includes: Local variances of non-noise information in the high-frequency components in various directions are estimated; and for each of the high-frequency components in each direction, noise filtering is performed on a wavelet coefficient of the high-frequency component based on a local variance of non-noise information in the high-frequency component, to obtain the denoised high-frequency wavelet coefficients corresponding to the high-frequency components in the various directions.

The non-noise information is information other than noise information. The local variance is used for representing the variance of pixel values corresponding to local pixel points in the image.

In an embodiment, for each of the high-frequency components of each direction, the server may use a window of a preset size to perform filtering based on the high-frequency component to obtain a filtering result. Then, the server may determine a local variance of non-noise information in the high-frequency component based on a difference between the filtering result and a preset noise variance.

In another embodiment, for each of the high-frequency components in each direction, the server may use a plurality of windows of different sizes to determine an initial local variance corresponding to the non-noise information in the high-frequency component in each of the windows, and then determine a final local variance of the non-noise information in the high-frequency component based on each initial local variance.

In an embodiment, for each of the high-frequency components in each direction, the server may perform noise filtering, by using a Wiener filter, on the wavelet coefficient of the high-frequency component based on a local variance of non-noise information in the high-frequency component, to obtain the denoised high-frequency wavelet coefficients corresponding to the high-frequency components in the various directions.

It is to be understood that the variance is stationary Gaussian white noise that varies spatially, assuming that the mean value of the noise in the image is zero, which is the design idea of the foregoing embodiment.

In the foregoing embodiment, the server can estimate the local variances of the non-noise information in the high-frequency components in the various directions, and then perform noise filtering on the wavelet coefficients of the high-frequency components based on the local variances of the non-noise information in the high-frequency components to obtain the denoised high-frequency wavelet coefficients corresponding to the high-frequency components, so that the high-frequency information can be accurately denoised to obtain accurate information after the denoising of the high-frequency information, and the noise can be particularly separated out from the high-frequency information to help obtain an accurate fixed pattern noise feature map subsequently.

In an embodiment, that the local variances of non-noise information in the high-frequency components in the various directions are estimated includes: For each of the high-frequency components in each direction, filtering is performed based on the high-frequency component by using a plurality of windows of different sizes, to obtain a filtering result corresponding to the high-frequency component in each of the windows; an initial local variance corresponding to the non-noise information in the high-frequency component in each of the windows is determined based on a difference between a filtering result and a preset noise variance that correspond to the same window; and a final local variance of the non-noise information in the high-frequency components is selected from the initial local variances.

The preset noise variance is a preset variance of the non-noise information in the high-frequency components. The initial local variance refers to a local variance of non-noise information in the high-frequency component in one window. The final local variance refers to a local variance of non-noise information in the high-frequency component that is finally determined based on initial local variances of the non-noise information in the high-frequency components in a plurality of windows of different sizes.

In an embodiment, for each of the high-frequency components in each direction, the server may square a pixel value of each pixel point in the image corresponding to the high-frequency component, and then filter a high-frequency component square diagram obtained after the squaring by using a plurality of windows of different sizes, to obtain a filtering result corresponding to the high-frequency component in each of the windows.

In an embodiment, the server may subtract a preset noise variance from a filtering result that correspond to the same window, to obtain the initial local variance corresponding to the non-noise information in the high-frequency component in each of the windows.

It is to be understood that by squaring the pixel value of each pixel point in the image corresponding to the high-frequency component, and then filtering the high-frequency component square diagram obtained after the squaring by using the windows, the filtering result can be very close to the preset noise variance. Then, by subtracting the preset noise variance from the filtering result, the local variance of the non-noise information in the high-frequency component can be determined.

In an embodiment, the server may select the smallest value in the initial local variances corresponding to the non-noise information in the high-frequency components in the different windows as the final local variance of the non-noise information in the high-frequency components.

In an embodiment, both the size of each window and the quantity of windows may be set to any number based on actual requirements. For example, four windows of sizes 3×3, 5×5, 7×7 and 9×9 may be selected.

In an embodiment, the preset noise variance may be set based on actual requirements. For example: The preset noise standard deviation may be set to 5, that is, the preset noise variance is 25.

In the foregoing embodiment, the local variances of the non-noise information in the high-frequency components are determined by using a plurality of windows of different sizes, thereby avoiding obtaining an inaccurate local variance due to the use of a single window. A more accurate local variance can be obtained by using a plurality of windows of different sizes, and the accuracy of the noise filtering on the wavelet coefficients of the high-frequency components can be improved.

Figure 4:
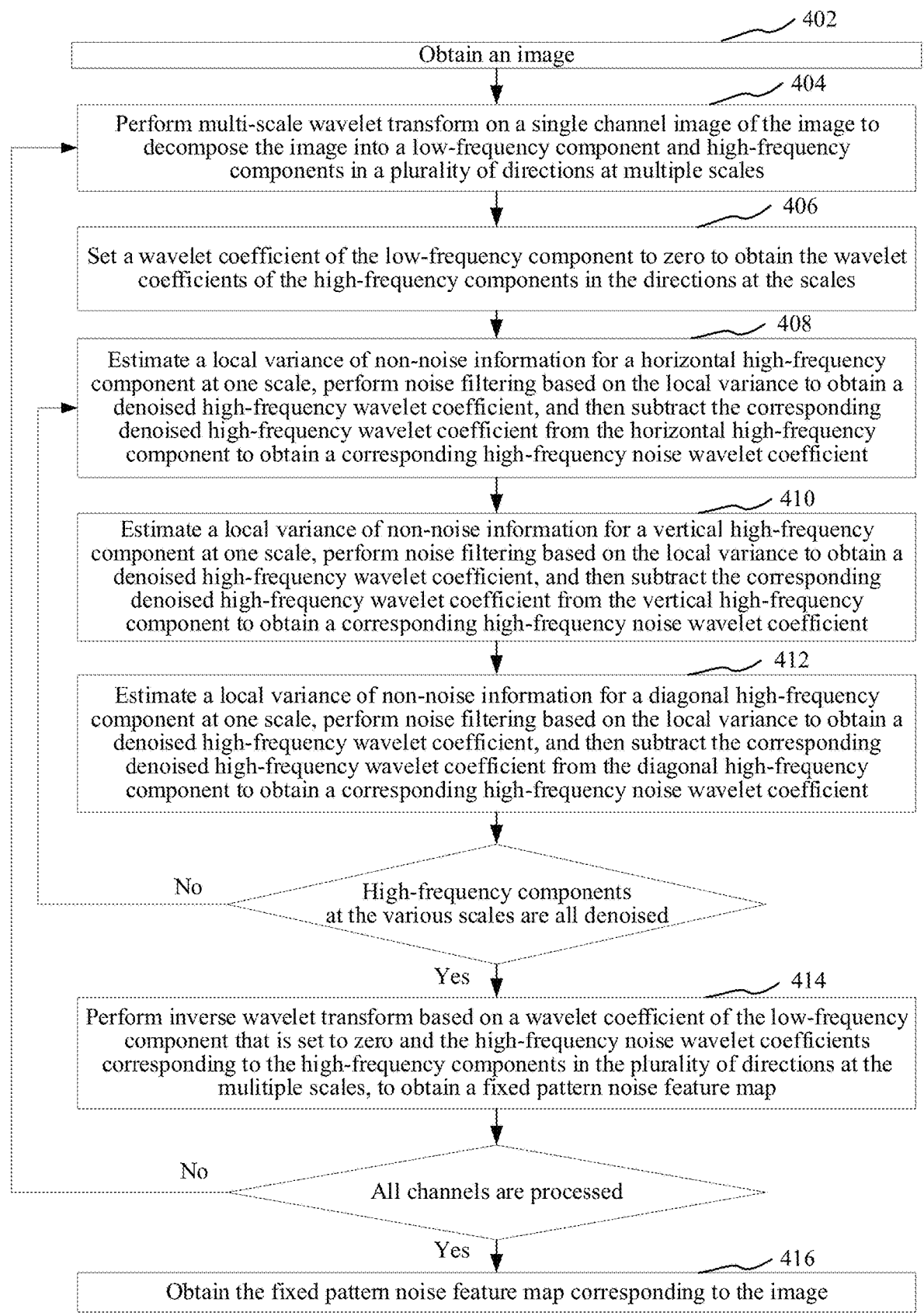
FIG. 4 is an overall schematic flowchart of extracting a fixed pattern noise feature map in an embodiment.

FIG. 4 is an overall schematic flowchart of steps of determining the fixed pattern noise feature map corresponding to the image in the foregoing embodiments, and specifically includes the following steps:

Step 402: Obtain an image.

Step 404: Perform multi-scale wavelet transform on a single channel image of the image, and decompose the image into a low-frequency component, and high-frequency components in various directions at various scales.

Step 406: Set a wavelet coefficient of the low-frequency component to zero to obtain the wavelet coefficients of the high-frequency components in the various directions at the various scales.

Step 408: Estimate a local variance of non-noise information for a horizontal high-frequency component at one scale, perform noise filtering based on the local variance to obtain a denoised high-frequency wavelet coefficient, and then subtract the corresponding denoised high-frequency wavelet coefficient from the horizontal high-frequency component to obtain a corresponding high-frequency noise wavelet coefficient.

Step 410: Estimate a local variance of non-noise information for a vertical high-frequency component at one scale, perform noise filtering based on the local variance to obtain a denoised high-frequency wavelet coefficient, and then subtract the corresponding denoised high-frequency wavelet coefficient from the vertical high-frequency component to obtain a corresponding high-frequency noise wavelet coefficient.

Step 412: Estimate a local variance of non-noise information for a diagonal high-frequency component at one scale, perform noise filtering based on the local variance to obtain a denoised high-frequency wavelet coefficient, and then subtract the corresponding denoised high-frequency wavelet coefficient from the diagonal high-frequency component to obtain a corresponding high-frequency noise wavelet coefficient.

Whether the high-frequency components at various scales are denoised is determined, and if no, step 408 is re-performed. If yes, step 414 is performed.

Step 414: Perform inverse wavelet transform based on a wavelet coefficient of the low-frequency component that is set to zero and the high-frequency noise wavelet coefficients corresponding to the high-frequency components in the various directions at the various scales, to obtain a fixed pattern noise feature map.

Whether processing on all channels is completed is determined, and if no, step 404 is re-performed. If yes, step 416 is performed.

Step 416: Obtain, based on the fixed pattern noise feature map of each channel, the fixed pattern noise feature map corresponding to the image.

In an embodiment, that the distribution of the fixed pattern noise in the fixed pattern noise feature map is analyzed, and the authenticity of the image is detected based on the distribution to obtain the authenticity detection result of the image includes: The fixed pattern noise feature map is input into a pre-trained authenticity detection model; and the distribution of the fixed pattern noise in the fixed pattern noise feature map is analyzed by using the authenticity detection model, and the authenticity of the image is detected based on the distribution to obtain an authenticity detection result of the image.

In an embodiment, the authenticity detection model may be a machine learning model.

In an embodiment, the authenticity detection model may be a neural network model. In an embodiment, the authenticity detection model may be a convolutional neural network model.

In an embodiment, the authenticity detection model may be an EfficientNet convolutional neural network model. In an embodiment, as factors such as model accuracy, storage, and time for training are considered, the authenticity detection model may be EfficientNet-B4 (one model from the EfficientNet family) convolutional neural network model. The EfficientNet convolutional neural networks demonstrate high performance when applied to image classification. Therefore, the convolution neural network described above can be used to classify and recognize the authenticity detection result of the image, thereby obtaining an accurate authenticity detection result.

Figure 5:
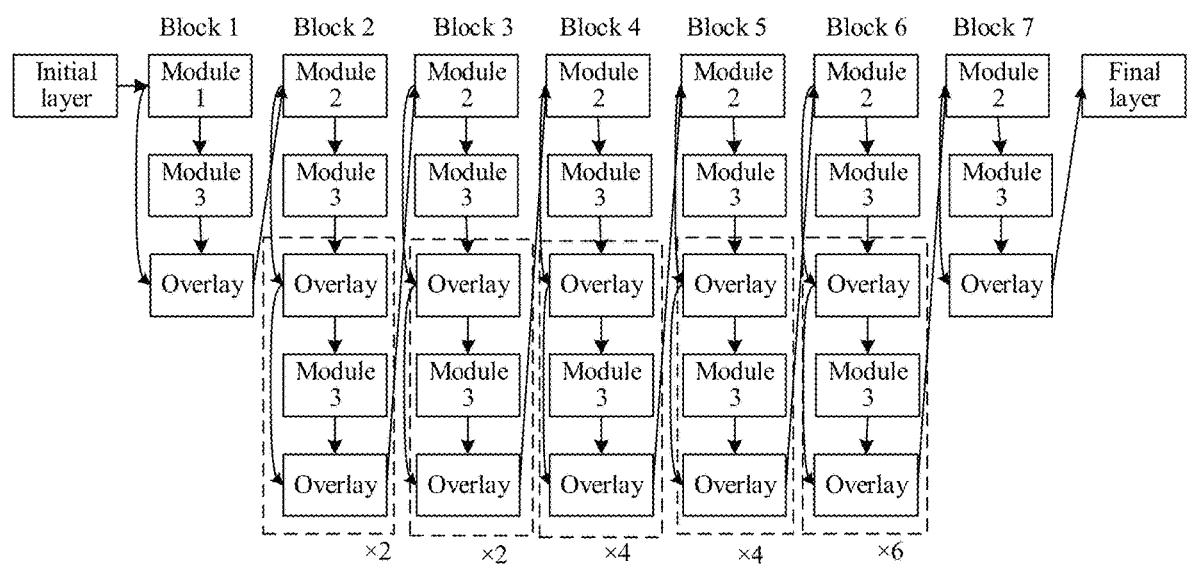
FIG. 5 is a schematic diagram of a network architecture of a convolutional neural network in an embodiment.

FIG. 5 is a network architecture of the EfficientNet-B4 convolutional neural network model. In the figure, "×2" represents that a module in a corresponding dotted-line box is repeated twice, "×4" represents that a module in a corresponding dotted-line box is repeated four times, and "×6" represents that a module in a corresponding dotted-line box is repeated six times. In other embodiments, the authenticity detection model may alternatively be a convolutional neural network model having other network architectures.

It is to be understood that the feature of photo-response non-uniformity that is the main component of fixed pattern noise is an inherent attribute of camera sensors and is not highly sensitive to image content. Therefore, if an image is forged by tampering, synthesis, artificial intelligence generation, or the like, the feature of photo-response non-uniformity in an original authentic image will be spoiled to some extent, hence a difference between distribution of the feature of photo-response non-uniformity of a forged image and an authentic image. Therefore, the server may determine the authenticity detection result of the image by analyzing the distribution of the fixed pattern noise in the fixed pattern noise feature map by using the pre-trained authenticity detection model. A difference between distribution of fixed pattern noise of a forged image and an authentic image can be learned by the authenticity detection model during model training, so that the accurate authenticity detection result of the image can be obtained by using the pre-trained authenticity detection model.

In an embodiment, the server may further input the fixed pattern noise feature map and an image-content-related feature together into a neural network model to obtain the authenticity detection result of the image. For example: An image-content-related feature in a face image may be at least one type of information of facial feature positions, skin tones face contours, etc.

In the foregoing embodiment, the server can accurately obtain the authenticity detection result of the image by analyzing the distribution of the fixed pattern noise in the fixed pattern noise feature map by using the authenticity detection model and detecting, based on the distribution, the authenticity of the image, so that the accuracy of detecting the authenticity of the image is improved. The EfficientNet-B4 convolutional neural network is used for the authenticity detection, and the accuracy is improved with improved efficiency of model training.

Figure 6:
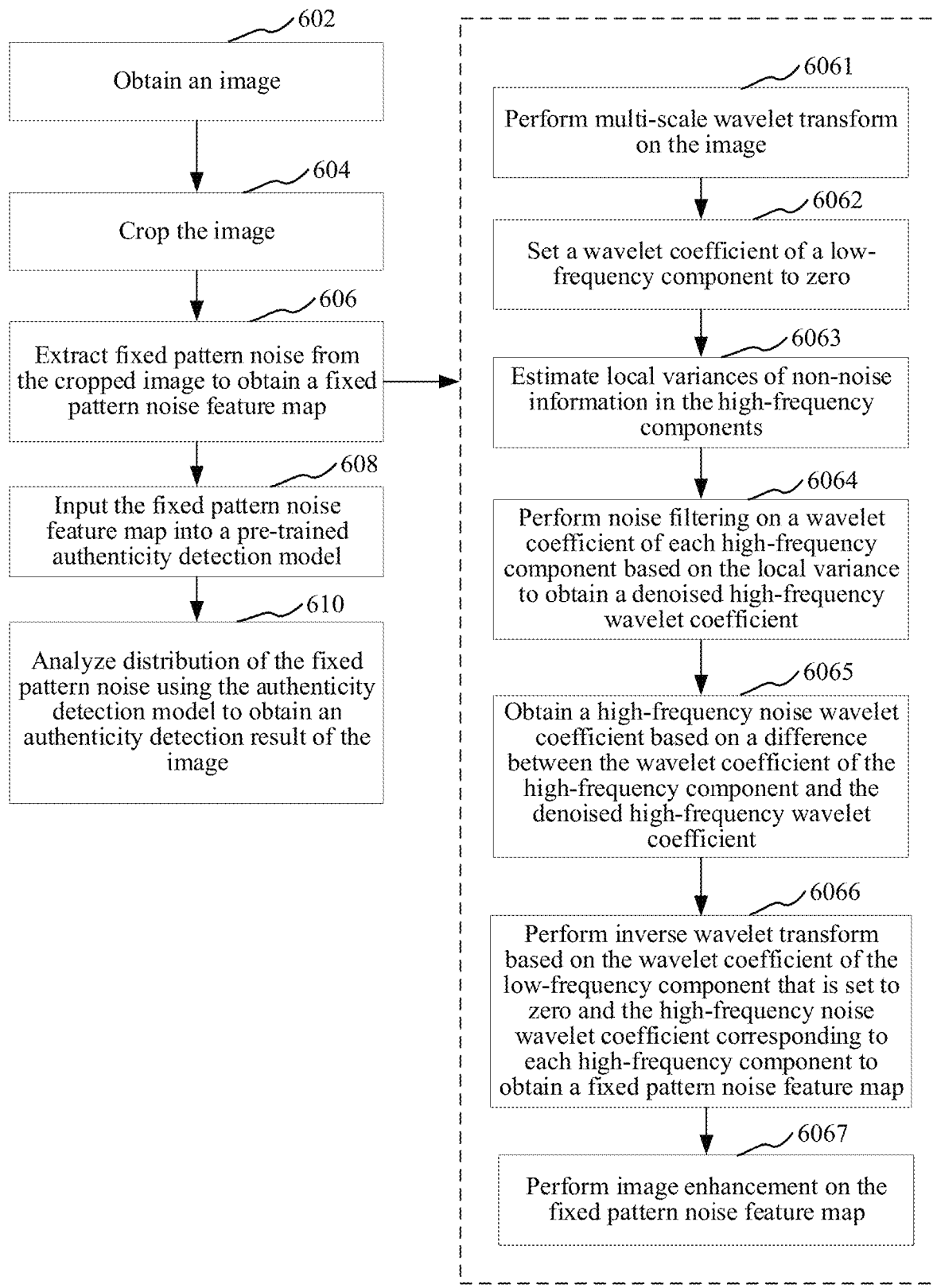
FIG. 6 is an overall schematic flowchart for detecting the authenticity of an image in an embodiment.

FIG. 6 is an overall schematic flowchart of obtaining the authenticity detection result of the image in the foregoing embodiments and specifically includes the following steps:

Step 602: Obtain an image.

Step 604: Crop the image.

Step 606: Extract fixed pattern noise from the image that is cropped and to be detected, to obtain a fixed pattern noise feature map.

Step 608: Input the fixed pattern noise feature map into a pre-trained authenticity detection model.

Step 610: Analyze distribution of the fixed pattern noise by using the authenticity detection model to obtain an authenticity detection result of the image.

Step 606 specifically includes the following steps:

Step 6061: Perform multi-scale wavelet transform on the image.

Step 6062: Set a wavelet coefficient of a low-frequency component to zero.

Step 6063: Estimate a local variance of non-noise information in each high-frequency component.

Step 6064: Perform noise filtering on a wavelet coefficient of each high-frequency component based on the local variance to obtain a denoised high-frequency wavelet coefficient.

Step 6065: Obtain a high-frequency noise wavelet coefficient based on a difference between the wavelet coefficient of the high-frequency component and the denoised high-frequency wavelet coefficient.

Step 6066: Perform inverse wavelet transform based on the wavelet coefficient of the low-frequency component that is set to zero and the high-frequency noise wavelet coefficient corresponding to each high-frequency component to obtain a fixed pattern noise feature map.

Step 6067: Perform image enhancement on the fixed pattern noise feature map.

In an embodiment, the authenticity detection model is obtained through a step of model training. The step of model training includes: A sample image and an authenticity label corresponding to sample image are obtained; fixed pattern noise is extracted from the sample image to obtain a sample fixed pattern noise feature map; the sample fixed pattern noise feature map is input into the authenticity detection model that is to be trained, distribution of fixed pattern noise in the sample fixed pattern noise feature map is analyzed by using the authenticity detection model, and detect, based on the distribution, the authenticity of the sample image corresponding to the sample fixed pattern noise feature map, to obtain an authenticity detection result of the sample image; and a model parameter of the authenticity detection model that is to be trained is iteratively adjusted based on a difference between the authenticity detection result of the sample image and the authenticity label corresponding to the sample image until a condition for stopping the iteration is satisfied, to obtain the trained authenticity detection model.

The authenticity label is used for indicating the authenticity of the sample image. The sample fixed pattern noise feature map is an image including fixed pattern noise in the sample image. The authenticity detection result of the sample image is the authenticity of the sample image detected during model training by using the authenticity detection model that is to be trained.

In an embodiment, the authenticity label may include that the sample image is an authentic image and that the sample image is a forged image. The authenticity detection result of the sample image may include that the sample image is an authentic image and that the sample image is a forged image.

In another embodiment, the authenticity label may include that the sample image is an authentic image and that the sample image is a forged image of a forgery type. The authenticity detection result of the sample image may include that the sample image is an authentic image and that the sample image is a forged image of a forgery type.

In an embodiment, the authenticity label corresponding to the sample image may be obtained by manually marking the sample image. In another embodiment, the sample image may be an image extracted from a sample video. The authenticity label of the sample image may be an authenticity label of the sample video where the sample image is from, and the authenticity label of the sample video may be obtained by manually marking the sample video.

Specifically, during each iteration, the server may adjust, based on the difference between the authenticity detection result of the sample image and the authenticity label corresponding to the sample image, the model parameter of the authenticity detection model that is to be trained, and go on to a next iteration until the condition about the difference for stopping the iteration is satisfied, to obtain the trained authenticity detection model.

In an embodiment, the server may use a cross-entropy loss function as a target function during the model training for measuring a difference. The condition for stopping the iteration may be that a loss value of the target function converges.

In the foregoing embodiment, the server can iteratively train the authenticity detection model based on the sample image and the corresponding authenticity label, and then obtain an authenticity detection model that can analyze the distribution of the fixed pattern noise in the sample fixed pattern noise feature map to obtain an accurate authenticity detection result, so that the accuracy of detecting the authenticity of the image is improved.

In an embodiment, that the fixed pattern noise is extracted from the sample image to obtain the sample fixed pattern noise feature map includes: Low-frequency information is removed from the sample image to obtain sample high-frequency information; the sample high-frequency information is denoised to obtain denoised sample information; and the sample fixed pattern noise feature map corresponding to the sample image is obtained based on a difference between the sample high-frequency information and the denoised sample information.

The sample high-frequency information is image information that is obtained after removing the low-frequency information from the sample image and that does not include the low-frequency information. The denoised sample information is image information obtained by denoising the sample high-frequency information.

In an embodiment, the server may decompose and remove the low-frequency information in the sample image by performing domain transform on the sample image, to obtain the sample high-frequency information. In an embodiment, the server may perform wavelet transform on the sample image, decompose the sample image into a sample low-frequency component and a plurality of sample high-frequency components, and set a wavelet coefficients of the sample low-frequency component to zero to obtain a wavelet coefficient of each sample high-frequency component.

In another embodiment, the server may filter the sample image by using a high-pass filter, to remove the low-frequency information from the sample image to obtain the sample high-frequency information.

In other embodiments, the server may alternatively remove the low-frequency information from the sample image in other manners, to obtain the sample high-frequency information. This is not limited.

In an embodiment, the server may perform noise filtering on the sample high-frequency information in the spatial domain to obtain the denoised sample information after the denoising. In another embodiment, the server may perform noise filtering on the sample high-frequency information in the transform domain to obtain the denoised sample information in the transform domain. In an embodiment, the transform domain may be any one of the wavelet domain, the frequency domain, and the like.

In an embodiment, the server may perform noise filtering on the sample high-frequency information by using a Wiener filter. In other embodiments, the server may alternatively use other filters to perform noise filtering on the sample high-frequency information, for example: a mean filter or a median filter.

In an embodiment, the server may perform noise filtering on each wavelet coefficient of each of the sample high-frequency components of the sample image in the wavelet domain to obtain a denoised sample high-frequency wavelet coefficient corresponding to each sample high-frequency component. In an embodiment, the server may estimate a local variance of non-noise information in each sample high-frequency component, and perform noise filtering on the wavelet coefficient of each sample high-frequency component based on the local variance, to obtain the denoised sample high-frequency wavelet coefficient corresponding to the sample high-frequency component.

In an embodiment, the server may subtract the denoised sample information from the sample high-frequency information to obtain the sample fixed pattern noise feature map corresponding to the sample image.

In an embodiment, the server may obtain a sample high-frequency noise wavelet coefficient based on a difference between the wavelet coefficient of the sample high-frequency component and the denoised sample high-frequency wavelet coefficient. Then, the server may perform inverse wavelet transform based on the wavelet coefficient of the sample low-frequency component that is set to zero and the sample high-frequency noise wavelet coefficient corresponding to each sample high-frequency component to obtain the sample fixed pattern noise feature map.

In an embodiment, the server may subtract the denoised sample high-frequency wavelet coefficient from the wavelet coefficient of the sample high-frequency component to obtain the sample high-frequency noise wavelet coefficient.

It is to be understood that the specific embodiment for the step of extracting the fixed pattern noise from the sample image to obtain the sample fixed pattern noise feature map is similar to the specific embodiment for obtaining the fixed pattern noise feature map corresponding to the image in the various embodiments of this disclosure.

In the foregoing embodiment, the server can remove the low-frequency information from the sample image to obtain the sample high-frequency information, and then denoise the sample high-frequency information to obtain the denoised sample information after the denoising. As the fixed pattern noise is mainly in the high-frequency information, the sample fixed pattern noise feature map corresponding to the sample image can be obtained accurately based on the difference between the sample high-frequency information and the denoised sample information.

In an embodiment, that the sample image and the authenticity label corresponding to sample image are obtained includes: A sample video carrying the authenticity label is obtained; the sample video is sampled to obtain a plurality of sample video frames corresponding to the sample video; each of the sample video frames is cropped into a preset size to obtain a sample image, and the authenticity label carried in the sample video where the sample image is from is used as an authenticity label corresponding to the sample image.

The sample video frame is a single-frame image from the sample video.

In an embodiment, the server may uniformly and randomly divide various obtained videos into a sample set and a test set. A video in the sample set is used as a sample video for model training. A video in the test set is used as a test video for testing the effect of the trained authenticity detection model after the model training is completed. Specifically, videos may be divided into different video sets based on a video type, and the server may randomly select a first preset quantity of videos from each type of video set and group the videos into a sample set, and then randomly select a second preset quantity of videos from each type of video set and group the videos into a test set. In an embodiment, the video type may include an authentic-video type and a plurality of forgery types.

Specifically, an authenticity label may be put on each sample video manually in accordance with the authenticity of each sample video. The server may obtain the sample video carrying the authenticity label, and sample the sample video according to a preset sampling rule, to obtain a plurality of sample video frames corresponding to the sample video. Then, the server may crop each of the sample video frames into a preset size to obtain the sample image, and use the authenticity label carried in the sample video where the sample image is from as the authenticity label corresponding to the sample image.

In an embodiment, there are a plurality of sample videos.

In an embodiment, the authenticity label may include that the sample video is an authentic video and that the sample video is a forged video. Specifically, if the authenticity label carried in the sample video where the sample image is from indicates that the sample video is an authentic video, that the sample image is an authentic image is used as the authenticity label of the sample image. If the authenticity label carried in the sample video where the sample image is from indicates that the sample video is a forged video, that the sample image is a forged image is used as the authenticity label of the sample image.

In another embodiment, the authenticity label may include that the sample video is an authentic video and that the sample video is a forged video of a forgery type. Specifically, if the authenticity label carried in the sample video where the sample image is from indicates that the sample video is an authentic video, that the sample image is an authentic image is used as the authenticity label of the sample image. If the authenticity label carried in the sample video where the sample image is from indicates that the sample video is a forged video of a forgery type, that the sample image is a forged image of the forgery type is used as the authenticity label of the sample image.

In an embodiment, the server may center crop a sample video frame based on a preset size. Specifically, the server may crop the sample video frame while using the center of the sample video frame as the center of the sample image obtained after the cropping, to obtain a sample image obtained after the cropping that is of the preset size. For example: It is assumed that the preset size is [224, 224], and then the server can utilize the center of the sample video frame and crop at a position with a distance of 112 from the center in each of four directions of up, down, left, and right, and an image obtained after the cropping that has a center that is the center of the sample video frame and that is of the size [224, 224] is the sample image. It is to be understood that if the sample video frame is a multichannel image, the preset size will have one more dimension indicating the quantity of channels. For example, if the sample video frame is a three-channel image, the preset size can be [224, 224, 3].

In the foregoing embodiment, the server can extract the sample image from the sample video, and use the authenticity label carried in the sample video as the authenticity label of the sample image, thereby obtaining the sample image from a video. In addition, by cropping the sample video frame to obtain the sample image, sizes of various sample images during training can be the same, and the sizes of the sample images can be smaller, thereby reducing the time overhead, improving the efficiency of model training, and preventing the fixed pattern noise between pixels in the sample image from being spoiled due to a scaling process.

In an embodiment, that the sample video is sampled to obtain the plurality of sample video frames corresponding to the sample video includes: For each sample video, each frame of the sample video is used as a sample video frame when a specified quantity of frames for sampling is greater than or equal to a total quantity of frames of the sample video.

Specifically, for each sample video, the server may determine the total quantity of frames of the sample video, and compare the total quantity of frames of the sample video with the specified quantity of frames for sampling. The server may use each frame of the sample video as a sample video frame when the specified quantity of frames for sampling is greater than or equal to the total quantity of frames of the sample video.

In the foregoing embodiment, for each sample video, the server can perform sampling based on the quantity of frames for sampling and the total quantity of frames of the sample video according to a corresponding rule, to uniformly obtain an appropriate quantity of sample images from the sample video and perform model training based on the sample image obtained by the sampling, thereby avoiding a high time overhead due to model training simply based on each frame of image of the sample video and improving the efficiency of the model training.

In an embodiment, that the sample video is sampled to obtain the plurality of sample video frames corresponding to the sample video includes: For each sample video, when a specified quantity of frames for sampling is less than a total quantity of frames of the sample video, a sampling interval is determined based on the total quantity and the quantity of frames for sampling, and the sample video frame is extracted from the sample video based on the sampling interval.

Specifically, for each sample video, the server may determine the total quantity of frames of the sample video, and compare the total quantity of frames of the sample video with the specified quantity of frames for sampling. When a specified quantity of frames for sampling is less than a total quantity of frames of the sample video, the server may determine a sampling interval based on the total quantity and the quantity of frames for sampling, and the sample video frame is extracted from the sample video based on the sampling interval.

In an embodiment, the server may determine a quotient, obtained by dividing the total quantity of frames by the quantity of frames for sampling, as the sampling interval, and extract the sample video frame from the sample video based on the sampling interval. In an embodiment, the server samples the sample video according to the following sampling rule:

[ ], frame_num≤0 or sample_num≤0;

[0, . . . , k, . . . , frame_num−1], frame_num≤sample_num;

[0, . . . , int(k*(frame_num/sample_num)),int(sample_num*

(frame_num/sample_num))], frame_num>sample_num;

where frame_num represents the total quantity of frames of the sample video, sample_num represents the specified quantity of frames for sampling, and k represents an index sequence number of extracted sample video frames.

It is to be understood that in the foregoing sampling rule, when frame_num≤0 or sample_num≤0, the sampling rule is [ ], meaning that when the total quantity of frames or the quantity of frames for sampling is less than or equal to 0, a sample video is not sampled. When frame_num≤sample_num, that is, the specified quantity of frames for sampling is greater than or equal to the total quantity of frames of the sample video, a $0^{th}$ frame, ..., the $k^{th}$ frame, ..., and the (frame_num−1)$^{th}$ frame are extracted from the sample video sequentially, that is, each frame of the sample video is extracted as a sample video frame. When frame_num>sample_num, that is, the specified quantity of frames for sampling is less than the total quantity of frames of the sample video, the quotient frame_num/sample_num, obtained by dividing the total quantity of frames by the quantity of frames for sampling, is determined as the sampling interval, and the sample video frame is extracted from the sample video based on the sampling interval.

In an embodiment, the specified quantity of frames for sampling may be set to any number based on actual requirements. For example: The quantity of frames for sampling may be set to 10.

In the foregoing embodiment, for each sample video, the server can perform sampling based on the quantity of frames for sampling and the total quantity of frames of the sample video according to a corresponding rule, to uniformly obtain an appropriate quantity of sample images from the sample video and perform model training based on the sample image obtained by the sampling, thereby avoiding a high time overhead due to model training simply based on each frame of image of the sample video and improving the efficiency of the model training.

Figure 7:
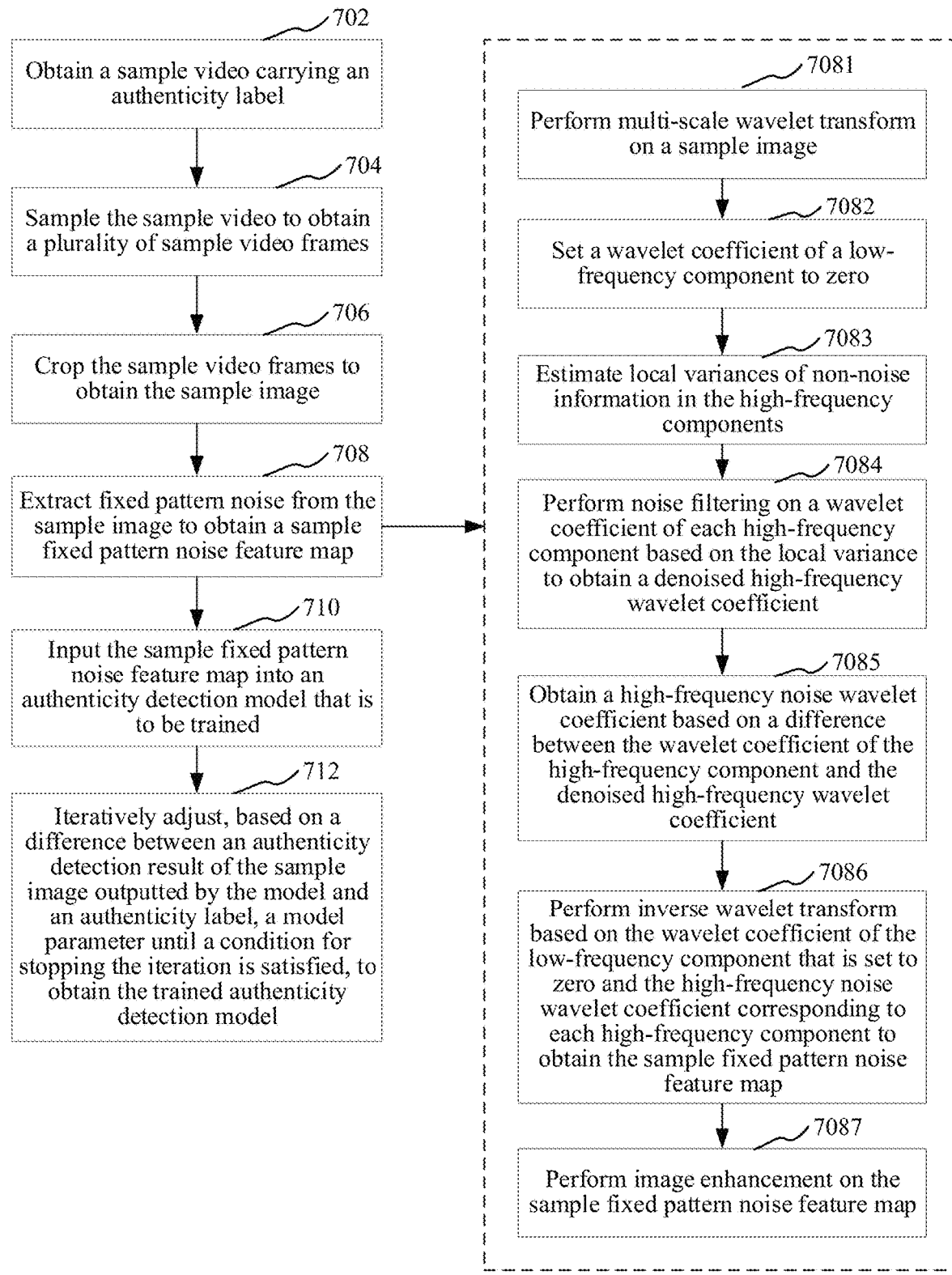
FIG. 7 is an overall schematic flowchart of model training method in an embodiment.

FIG. 7 is an overall schematic flowchart of the steps for model training of the authenticity detection model in the foregoing embodiments and specifically includes the following steps:

Step 702: Obtain a sample video carrying the authenticity label.

step 704: Sample the sample video to obtain a plurality of sample video frames.

Step 706: Crop the sample video frames to obtain the sample image.

Step 708: Extract fixed pattern noise from the sample image to obtain a sample fixed pattern noise feature map.

Step 710: Input the sample fixed pattern noise feature map into an authenticity detection model that is to be trained.

Step 712: Iteratively adjust, based on a difference between an authenticity detection result of the sample image outputted by the model and an authenticity label, a model parameter until a condition for stopping the iteration is satisfied, to obtain the trained authenticity detection model.

Step 708 specifically includes the following steps:

Step 7081: Perform multi-scale wavelet transform on the sample image.

Step 7082: Set a wavelet coefficient of a low-frequency component to zero.

Step 7083: Estimate a local variance of non-noise information in each high-frequency component.

Step 7084: Perform noise filtering on a wavelet coefficient of each high-frequency component based on the local variance to obtain a denoised high-frequency wavelet coefficient.

Step 7085: Obtain a high-frequency noise wavelet coefficient based on a difference between the wavelet coefficient of the high-frequency component and the denoised high-frequency wavelet coefficient.

Step 7086: Perform inverse wavelet transform based on the wavelet coefficient of the low-frequency component that is set to zero and the high-frequency noise wavelet coefficient corresponding to each high-frequency component to obtain a sample fixed pattern noise feature map.

Step 7087: Perform image enhancement on the sample fixed pattern noise feature map.

In an embodiment, the authenticity of the image is detected based on the distribution to obtain the authenticity detection result of the image includes: The image is recognized as an authentic image when the distribution matches distribution of fixed pattern noise of an authentic image.

Specifically, the server may determine the distribution matches which distribution of fixed pattern noise by analyzing the distribution of the fixed pattern noise in the fixed pattern noise feature map by using the pre-trained authenticity detection model. The authenticity detection model can recognize the image as an authentic image when the distribution matches distribution of fixed pattern noise of an authentic image.

In the foregoing embodiment, because distribution of pattern noise in an authentic image is different from that in a forged image, and the difference, without being interfered by image content, is not difficult to be identified. Therefore, the server can accurately recognize whether the image is an authentic image based on the distribution of the fixed pattern noise in the fixed pattern noise feature map.

In an embodiment, the authenticity of the image is detected based on the distribution to obtain the authenticity detection result of the image includes: When the distribution matches distribution of fixed pattern noise of a preset forgery type, the image is recognized as a forged image of the forgery type based on the forgery type corresponding to the matched distribution of the fixed pattern noise.

Specifically, the server may determine the distribution matches which distribution of fixed pattern noise by analyzing the distribution of the fixed pattern noise in the fixed pattern noise feature map by using the pre-trained authenticity detection model. When the distribution matches distribution of fixed pattern noise of a preset forgery type, the authenticity detection model can recognize the image as a forged image of the forgery type based on the forgery type corresponding to the matched distribution of the fixed pattern noise.

For example: When the distribution matches distribution of fixed pattern noise of a type of synthesis, the authenticity detection model can recognize the image as a forged image of the type of synthesis.

In the foregoing embodiment, because distribution of pattern noise in an authentic image is different from that in a forged image, and the difference, without being interfered by image content, is not difficult to be identified. Therefore, the server can accurately recognize whether the image is a forged image of a forgery type based on the distribution of the fixed pattern noise in the fixed pattern noise feature map. In addition, when the image is a forged image, the server can not only recognize the image as a forged image but also identify a forgery type, thereby providing more information.

This disclosure further provides an application scenario. The application scenario is an application scenario for security detection on face images, and the image authenticity detection method is applied to the application scenario. Specifically, the application of the image authenticity detection method in the application scenario is as follows:

When a user uses face recognition in software or an application (app) on a terminal, the terminal may acquire an image of the user's face, and send the image of the user's face to a server for face recognition. However, due to some illegality in which a forged image is used to replace the image of the user's face, it is possible that the image finally sent to the server for face recognition is not the authentic image of the user's face but a forged face image. Therefore, before the server performs face recognition, the server can first perform the image authenticity detection method in the embodiments of this disclosure, to detect the authenticity of the face image and obtain an authenticity detection result. If the face image is recognized as an authentic face image, the server may continue to perform face recognition on the face image. If the face image is recognized as a forged face image, the server may not perform face recognition on the face image, and feed back information about the recognized forged image to the terminal, thereby effectively protecting the safety of the user's life, properties, and reputation and enhancing the safety level during face recognition.

This disclosure further provides an application scenario. The application scenario is an application scenario for image authentication. The image authenticity detection method is applied to the application scenario. Specifically, the application of the image authenticity detection method in the application scenario is as follows:

In a scenario in which the authenticity of an image is required to be detected, for example: when the authenticity of news pictures or pictures on some illegal websites are detected, a user may input an image by using a terminal, the terminal may send the image to a server, and the server may perform the image authenticity detection method in the embodiments of this disclosure to obtain an authenticity detection result of the image and return the authenticity detection result to the terminal for display, thereby helping the user to detect the authenticity of the image.

It is to be understood that, although the steps in the flowcharts are sequentially shown according to indication of an arrow, the steps are not necessarily sequentially performed according to a sequence indicated by the arrow. Unless otherwise explicitly specified in this specification, execution of the steps is not strictly limited, and the steps may be performed in other sequences. In addition, at least some steps in the flowcharts may include a plurality of steps or a plurality of stages. The steps or the stages are not necessarily performed at the same moment, but may be performed at different moments. The steps or the stages are not necessarily performed in sequence, but may be performed in turn or alternately with another step or at least some of steps or stages of the another step.

Figure 8:
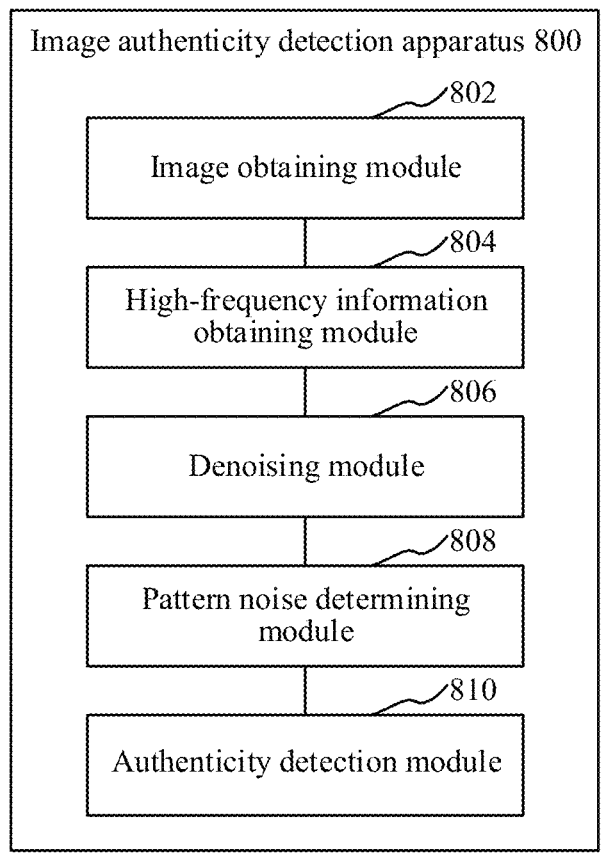
FIG. 8 is a block diagram of a structure of an image authenticity detection apparatus in an embodiment.
Figure 9:
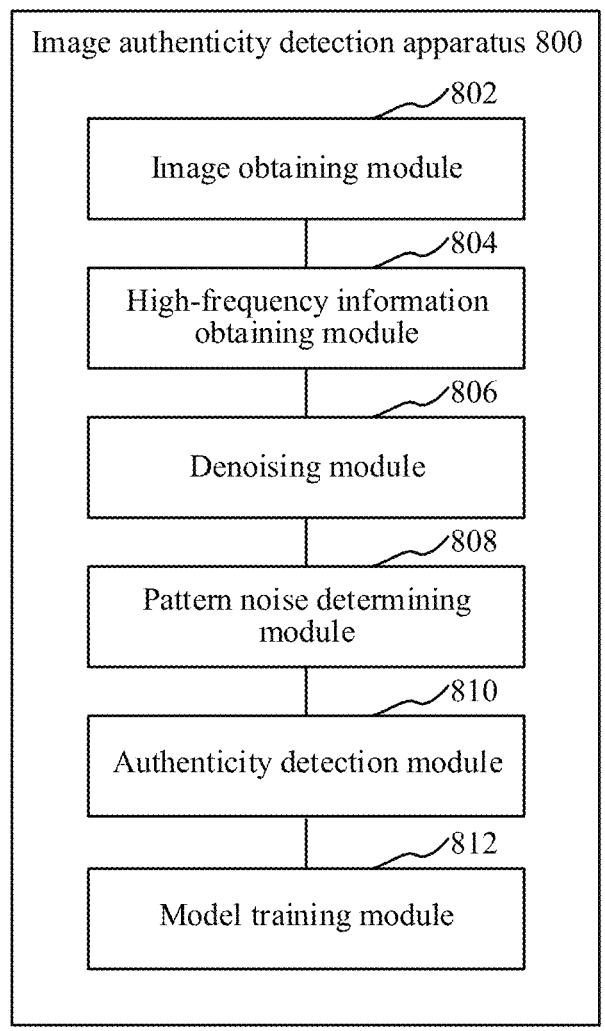
FIG. 9 is a block diagram of a structure of an image authenticity detection apparatus in another embodiment.

In an embodiment, as shown in FIG. 8, an image authenticity detection apparatus 800 is provided. The apparatus may use a software module, a hardware module, or a combination thereof as a part of a computer device, and the apparatus specifically includes: an image obtaining module 802, a high-frequency information obtaining module 804, a denoising module 806, a pattern noise determining module 808, and an authenticity detection module 810.

Herein, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The image obtaining module 802 is configured to obtain an image.

The high-frequency information obtaining module 804 is configured to remove low-frequency information from image to obtain first image information.

The denoising module 806 is configured to denoise the first image information to obtain denoised second image information.

The pattern noise determining module 808 is configured to obtain, based on a difference between the first image information and the second image information, a fixed pattern noise feature map corresponding to the image.

The authenticity detection module 810 is configured to: analyze distribution of fixed pattern noise in the fixed pattern noise feature map, and detect, based on the distribution, the authenticity of the image, to obtain an authenticity detection result of the image. The fixed pattern noise is inherent noise from a camera sensor and not interfered by image content.

In an embodiment, the first image information includes wavelet coefficients of high-frequency components of the image in various directions in the wavelet domain. In this embodiment, the high-frequency information obtaining module 804 is further configured to: perform wavelet transform on the image in the spatial domain, and decompose the image into a low-frequency component, and high-frequency components in a plurality of directions, in the wavelet domain; and set a wavelet coefficient of the low-frequency component to zero to obtain the wavelet coefficients of the high-frequency components in the various directions.

In an embodiment, the second image information includes denoised high-frequency wavelet coefficients corresponding to the high-frequency components of the image in the various directions in the wavelet domain. In an embodiment, the denoising module 806 is further configured to denoise the wavelet coefficients of the high-frequency components in the various directions to obtain the denoised high-frequency wavelet coefficients corresponding to the high-frequency components in the various directions. In this embodiment, the pattern noise determining module 808 is further configured to: obtain high-frequency noise wavelet coefficients corresponding to the high-frequency components in the various directions based on a difference between the wavelet coefficients of the high-frequency components and the denoised high-frequency wavelet coefficients of the high-frequency components that correspond to the same direction; and perform inverse wavelet transform based on the wavelet coefficient of the low-frequency component that is set to zero and the high-frequency noise wavelet coefficients corresponding to the high-frequency components in the various directions, to obtain the fixed pattern noise feature map corresponding to the image.

In this embodiment, the high-frequency information obtaining module 804 is further configured to: perform multi-scale wavelet transform on the image in the spatial domain, and decompose the image into a low-frequency component, and high-frequency components at various scales. High-frequency components at the same scale include high-frequency components in a plurality of directions. In this embodiment, the pattern noise determining module 808 is further configured to perform inverse wavelet transform based on the wavelet coefficient of the low-frequency component that is set to zero and the high-frequency noise wavelet coefficients corresponding to the high-frequency components in the various directions at the various scales, to obtain the fixed pattern noise feature map corresponding to the image.

In an embodiment, the denoising module 806 is further configured to: estimate local variances of non-noise information in the high-frequency components in the various directions; and for each of the high-frequency components in each direction, perform noise filtering on a wavelet coefficient of the high-frequency component based on a local variance of non-noise information in the high-frequency component, to obtain the denoised high-frequency wavelet coefficients corresponding to the high-frequency components in the various directions.

In an embodiment, the denoising module 806 is further configured to: for each of the high-frequency components in each direction, perform filtering based on the high-frequency component by using a plurality of windows of different sizes, to obtain a filtering result corresponding to the high-frequency component in each of the windows; determine an initial local variance corresponding to the non-noise information in the high-frequency component in each of the windows based on a difference between a filtering result and a preset noise variance that correspond to the same window; and select a final local variance of the non-noise information in the high-frequency components from the initial local variances.

In an embodiment, the authenticity detection module 810 is further configured to: input the fixed pattern noise feature map into a pre-trained authenticity detection model; and analyze the distribution of the fixed pattern noise in the fixed pattern noise feature map by using the authenticity detection model, and detect, based on the distribution, the authenticity of the image, to obtain an authenticity detection result of the image.

In an embodiment, the image authenticity detection apparatus further includes:

a model training module 812, configured to: obtain a sample image and an authenticity label corresponding to the sample image; extract fixed pattern noise from the sample image to obtain a sample fixed pattern noise feature map; input the sample fixed pattern noise feature map into the authenticity detection model that is to be trained, analyze distribution of fixed pattern noise in the sample fixed pattern noise feature map by using the authenticity detection model, and detect, based on the distribution, the authenticity of the sample image corresponding to the sample fixed pattern noise feature map, to obtain an authenticity detection result of the sample image; and iteratively adjust, based on a difference between the authenticity detection result of the sample image and the authenticity label corresponding to the sample image, a model parameter of the authenticity detection model that is to be trained until a condition for stopping the iteration is satisfied, to obtain the trained authenticity detection model.

In an embodiment, the model training module 812 is further configured to: remove low-frequency information from the sample image to obtain sample high-frequency information; denoise the sample high-frequency information to obtain denoised sample information; and obtain the sample fixed pattern noise feature map corresponding to the sample image based on a difference between the sample high-frequency information and the denoised sample information.

In an embodiment, the model training module 812 is further configured to: obtain a sample video carrying the authenticity label; sample the sample video to obtain a plurality of sample video frames corresponding to the sample video; and crop each of the sample video frames into a preset size to obtain a sample image, and use the authenticity label carried in the sample video where the sample image is from as an authenticity label corresponding to the sample image.

In an embodiment, the model training module 812 is further configured to: for each sample video, use each frame of the sample video as a sample video frame when a specified quantity of frames for sampling is greater than or equal to a total quantity of frames of the sample video; or when a specified quantity of frames for sampling is less than a total quantity of frames of the sample video, determine a sampling interval based on the total quantity and the quantity of frames for sampling, and extract the sample video frame from the sample video based on the sampling interval.

In an embodiment, the authenticity detection module 810 is further configured to: recognize the image as an authentic image when the distribution matches distribution of fixed pattern noise of an authentic image; or when the distribution matches distribution of fixed pattern noise of a preset forgery type, recognize the image as a forged image of the forgery type based on the forgery type corresponding to the matched distribution of the fixed pattern noise.

By using the image authenticity detection apparatus described above, the low-frequency information is removed from the image to obtain the first image information, the first image information is denoised to obtain the denoised second image information, and the fixed pattern noise feature map corresponding to the image is obtained based on the difference between the first image information and the second image information, where the fixed pattern noise in the fixed pattern noise feature map is inherent noise from a camera sensor and not interfered by image content, so that distribution of pattern noise in an authentic image is different from that in a forged image, and the difference, without being interfered by image content, is not difficult to be identified. Therefore, by analyzing the distribution of the fixed pattern noise in the fixed pattern noise feature map, an accurate authenticity detection result of the image can be obtained, and the accuracy of the authenticity detection result is improved.

For a specific limitation on the image authenticity detection apparatus, reference is made to the limitation on the image authenticity detection method above. Each module in the foregoing image authenticity detection apparatus may be implemented in whole or in part by software, hardware, and combinations thereof. The foregoing modules may be built in or independent of one or more processors of a computer device in a hardware form, or may be stored in a memory of the computer device in a software form, so that one or more processors invoke and perform an operation corresponding to each of the foregoing modules.

In an embodiment, a computer device is provided. The computer device may be a server, and an internal structure diagram thereof may be shown in FIG. 10. The computer device 1000 includes one or more processors 1001, a memory, and a network interface 1005 that are connected by using a system bus 1002. The one or more processors of the computer device 1000 are configured to provide computing and control capabilities. The memory of the computer device 1000 includes a non-volatile storage medium 1003 and an internal memory 1004. The non-volatile storage medium 1003 stores an operating system, computer-readable instructions, and a database. The internal memory 1004 provides an environment for running of the operating system and the computer-readable instruction in the non-volatile storage medium. The database of the computer device 100 is configured to store model data. The network interface 1005 of the computer device 100 is configured to communicate with an external terminal through a network connection. The computer-readable instruction is executed by one or more processors to implement the image authenticity detection method.

Figure 10:
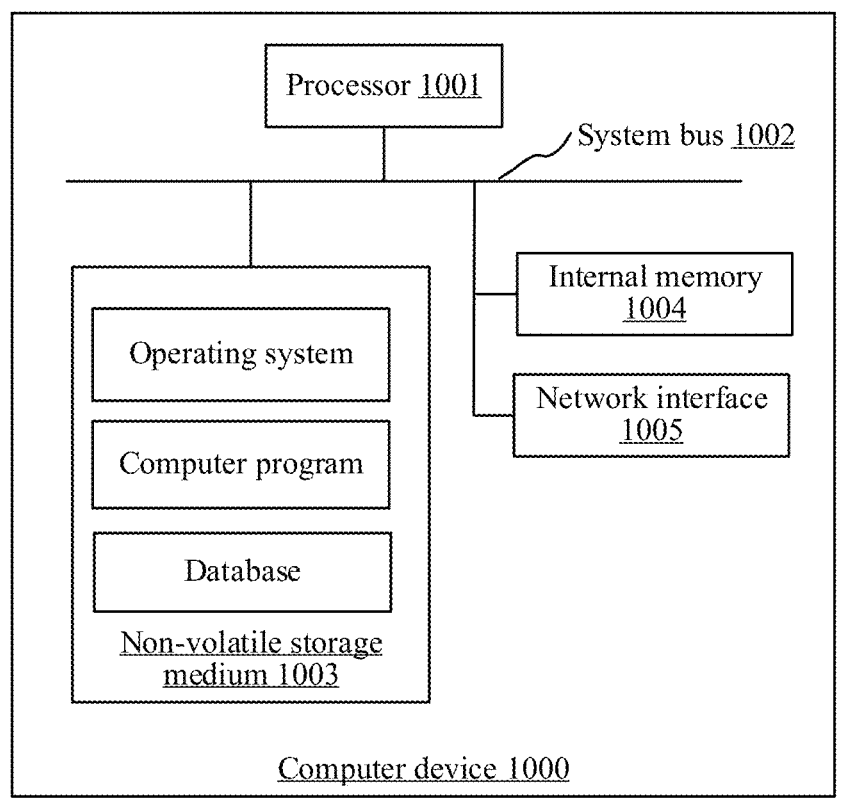
FIG. 10 is a diagram of an internal structure of a computer device in an embodiment.

A person skilled in the art may understand that, the structure shown in FIG. 10 is only a block diagram of a part of a structure related to a solution of this disclosure and does not limit the computer device to which the solution of this disclosure is applied. Specifically, the computer device may include more or fewer members than those in the drawings, or include a combination of some members, or include different member layouts.

In an embodiment, a computer device is further provided, including a memory and one or more processors, the memory storing computer-readable instructions, the one or more processors, when executing the computer-readable instructions, implementing the steps in the foregoing method embodiments.

In an embodiment, one or more computer-readable storage media are provided, storing computer-readable instructions, the computer-readable instructions, when executed by one or more processors, implementing the steps in the foregoing method embodiments.

In an embodiment, a computer program product is provided. The computer program product includes computer-readable instructions, and the computer-readable instructions are stored in a computer-readable storage medium. The one or more processors of the computer device read the computer-readable instructions from the computer-readable storage medium, and the one or more processors execute the computer-readable instructions, to cause the computer device to perform the steps in the method embodiments.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a storage, a database, or another medium used in the embodiments provided in this disclosure may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiments may be randomly combined. For concise description, not all possible combinations of the technical features in the embodiment are described. However, provided that combinations of the technical features do not conflict with each other, the combinations of the technical features are considered as falling within the scope recorded in this specification.

The foregoing embodiments only describe several implementations of this disclosure, which are described specifically and in detail, but cannot be construed as a limitation to the patent scope of this disclosure. A person of ordinary skill in the art may make various changes and improvements without departing from the ideas of this disclosure, which shall all fall within the protection scope of this disclosure. Therefore, the protection scope of this disclosure shall be subject to the protection scope of the appended claims.

What is claimed is:

1. An image authenticity detection method, performed by a computer device, comprising:
    obtaining an image;
    removing low-frequency information from the image to obtain first image information of the image;
    denoising the first image information to obtain second image information;
    determining, based on a difference between the first image information and the second image information, a fixed pattern noise feature map corresponding to the image;
    analyzing distribution of fixed pattern noise in the fixed pattern noise feature map, the fixed pattern noise being inherent noise from a camera sensor and not interfered by image content; and
    detecting, based on the distribution of fixed pattern noise in the fixed pattern noise feature map, authenticity of the image to obtain an authenticity detection result of the image, the authenticity detection result including that the image is an authentic image or the image is a forged image, wherein the detecting further comprises in response to the distribution matching fixed pattern noise distribution of a preset forgery type, determining the image to be a forged image of the forgery type based on the forgery type corresponding to the matched fixed pattern noise distribution, the forgery type comprises at least one of a type of tampering, a type of synthesis, or a type of artificial intelligence generation.

2. The method according to claim 1, wherein the first image information comprises wavelet coefficients of high-frequency components in a plurality of directions of the image in wavelet domain, and the removing the low-frequency information from the image to obtain the first image information comprises:
    performing wavelet transform on the image in spatial domain to decompose the image into a low-frequency component and high-frequency components in a plurality of directions in the wavelet domain; and
    setting a wavelet coefficient of the low-frequency component to zero to obtain wavelet coefficients of the high-frequency components in the plurality of directions.

3. The method according to claim 2, wherein the second image information comprises denoised high-frequency wavelet coefficients corresponding to the high-frequency components in the plurality of directions of the image in the wavelet domain, and the denoising the first image information to obtain denoised second image information comprises:
    denoising the wavelet coefficients of the high-frequency components in the plurality of directions to obtain the denoised high-frequency wavelet coefficients corresponding to the high-frequency components in the plurality of directions.

4. The method according to claim 3, wherein the obtaining the fixed pattern noise feature map corresponding to the image comprises:
    obtaining high-frequency noise wavelet coefficients corresponding to the high-frequency components in the plurality of directions based on a difference between the wavelet coefficients of the high-frequency components and the denoised high-frequency wavelet coefficients of the high-frequency components that correspond to a same direction; and
    performing inverse wavelet transform based on the wavelet coefficient of the low-frequency component that is set to zero and the high-frequency noise wavelet coefficients corresponding to the high-frequency components in the plurality of directions, to obtain the fixed pattern noise feature map corresponding to the image.

5. The method according to claim 4, wherein the performing the wavelet transform on the image in spatial domain comprises:
performing multi-scale wavelet transform on the image in the spatial domain to decompose the image into a low-frequency component, and high-frequency components at a plurality of scales, high-frequency components at a same scale comprising high-frequency components in a plurality of directions.

6. The method according to claim 4, wherein the performing the inverse wavelet transform to obtain the fixed pattern noise feature map corresponding to the image comprises:
performing inverse wavelet transform based on the wavelet coefficient of the low-frequency component that is set to zero and the high-frequency noise wavelet coefficients corresponding to the high-frequency components in the plurality of directions at the plurality of scales, to obtain the fixed pattern noise feature map corresponding to the image.

7. The method according to claim 3, wherein the denoising the wavelet coefficients of the high-frequency components in the plurality of directions to obtain the denoised high-frequency wavelet coefficients corresponding to the high-frequency components in the plurality of directions comprises:
estimating local variances of non-noise information in the high-frequency components in the plurality of directions; and
for each of the high-frequency components in each of the plurality of directions, performing noise filtering on a wavelet coefficient of the high-frequency component based on a local variance of non-noise information in the high-frequency component, to obtain the denoised high-frequency wavelet coefficients corresponding to the high-frequency components in the plurality of directions.

8. The method according to claim 7, wherein the estimating the local variances of non-noise information in the high-frequency components in the plurality of directions comprises:
for each of the high-frequency components in each of the plurality of directions, using a plurality of windows of different sizes to perform filtering based on the high-frequency component to obtain a filtering result corresponding to the high-frequency component in each of the windows;
determining an initial local variance corresponding to the non-noise information in the high-frequency component in each of the windows based on a difference between a filtering result and a preset noise variance that correspond to a same window; and
selecting a final local variance of the non-noise information in the high-frequency components from the initial local variances.

9. The method according to claim 1, wherein the analyzing the distribution of the fixed pattern noise in the fixed pattern noise feature map comprises:
inputting the fixed pattern noise feature map into a pre-trained authenticity detection model;
analyzing, with the authenticity detection model, the distribution of fixed pattern noise in the fixed pattern noise feature map; and
detecting, based on the distribution, the authenticity of the image to obtain an authenticity detection result of the image.

10. The method according to claim 1, wherein the detecting the authenticity of the image to obtain an authenticity detection result of the image comprises:
determining the image as an authentic image in response to the distribution matching fixed pattern noise distribution of an authentic image.

11. An image authenticity detection apparatus, comprising:
a memory operable to store computer-readable instructions; and
a processor circuitry operable to read the computer-readable instructions, the processor circuitry when executing the computer-readable instructions is configured to:
obtain an image;
remove low-frequency information from the image to obtain first image information of the image;
denoise the first image information to obtain second image information;
determine, based on a difference between the first image information and the second image information, a fixed pattern noise feature map corresponding to the image;
analyze distribution of fixed pattern noise in the fixed pattern noise feature map, the fixed pattern noise being inherent noise from a camera sensor and not interfered by image content; and
detect, based on the distribution of fixed pattern noise in the fixed pattern noise feature map, authenticity of the image to obtain an authenticity detection result of the image, the authenticity detection result including that the image is an authentic image or the image is a forged image, wherein the detecting further comprises in response to the distribution matching fixed pattern noise distribution of a preset forgery type, determining the image to be a forged image of the forgery type based on the forgery type corresponding to the matched fixed pattern noise distribution, the forgery type comprises at least one of a type of tampering, a type of synthesis, or a type of artificial intelligence generation.

12. The apparatus according to claim 11, wherein the first image information comprises wavelet coefficients of high-frequency components in a plurality of directions of the image in wavelet domain, and the processor circuitry is configured to:
perform wavelet transform on the image in spatial domain to decompose the image into a low-frequency component and high-frequency components in a plurality of directions in the wavelet domain; and
set a wavelet coefficient of the low-frequency component to zero to obtain wavelet coefficients of the high-frequency components in the plurality of directions.

13. The apparatus according to claim 12, wherein the second image information comprises denoised high-frequency wavelet coefficients corresponding to the high-frequency components in the plurality of directions of the image in the wavelet domain, and the processor circuitry is configured to:
denoise the wavelet coefficients of the high-frequency components in the plurality of directions to obtain the denoised high-frequency wavelet coefficients corresponding to the high-frequency components in the plurality of directions.

14. The apparatus according to claim 13, wherein the processor circuitry is configured to:
- obtain high-frequency noise wavelet coefficients corresponding to the high-frequency components in the plurality of directions based on a difference between the wavelet coefficients of the high-frequency components and the denoised high-frequency wavelet coefficients of the high-frequency components that correspond to a same direction; and
- perform inverse wavelet transform based on the wavelet coefficient of the low-frequency component that is set to zero and the high-frequency noise wavelet coefficients corresponding to the high-frequency components in the plurality of directions, to obtain the fixed pattern noise feature map corresponding to the image.

15. The apparatus according to claim 14, wherein the processor circuitry is configured to:
- perform multi-scale wavelet transform on the image in the spatial domain to decompose the image into a low-frequency component, and high-frequency components at a plurality of scales, high-frequency components at a same scale comprising high-frequency components in a plurality of directions.

16. The apparatus according to claim 15, wherein the processor circuitry is configured to:
- perform inverse wavelet transform based on the wavelet coefficient of the low-frequency component that is set to zero and the high-frequency noise wavelet coefficients corresponding to the high-frequency components in the plurality of directions at the plurality of scales, to obtain the fixed pattern noise feature map corresponding to the image.

17. The apparatus according to claim 13, wherein the processor circuitry is configured to:
- estimate local variances of non-noise information in the high-frequency components in the plurality of directions; and
- for each of the high-frequency components in each of the plurality of directions, perform noise filtering on a wavelet coefficient of the high-frequency component based on a local variance of non-noise information in the high-frequency component, to obtain the denoised high-frequency wavelet coefficients corresponding to the high-frequency components in the plurality of directions.

18. The apparatus according to claim 11, wherein the processor circuitry is configured to:
- input the fixed pattern noise feature map into a pre-trained authenticity detection model;
- analyze, with the authenticity detection model, the distribution of fixed pattern noise in the fixed pattern noise feature map; and
- detect, based on the distribution, the authenticity of the image to obtain an authenticity detection result of the image.

19. A non-transitory machine-readable media, having instructions stored on the machine-readable media, the instructions configured to, when executed, cause a machine to:
- obtain an image;
- remove low-frequency information from the image to obtain first image information of the image;
- denoise the first image information to obtain second image information;
- determine, based on a difference between the first image information and the second image information, a fixed pattern noise feature map corresponding to the image;
- analyze distribution of fixed pattern noise in the fixed pattern noise feature map, the fixed pattern noise being inherent noise from a camera sensor and not interfered by image content; and
- detect, based on the distribution of fixed pattern noise in the fixed pattern noise feature map, authenticity of the image to obtain an authenticity detection result of the image, the authenticity detection result including that the image is an authentic image or the image is a forged image, wherein the detecting further comprises in response to the distribution matching fixed pattern noise distribution of a preset forgery type, determining the image to be a forged image of the forgery type based on the forgery type corresponding to the matched fixed pattern noise distribution, the forgery type comprises at least one of a type of tampering, a type of synthesis, or a type of artificial intelligence generation.

* * * * *